United States Patent [19]

Kakui et al.

[11] Patent Number: 5,742,427
[45] Date of Patent: Apr. 21, 1998

[54] OPTICAL FIBER AMPLIFIER

[75] Inventors: Motoki Kakui; Masayuki Shigematsu, both of Yokohama, Japan

[73] Assignee: Sumitomo Electric Industries, Ltd., Osaka, Japan

[21] Appl. No.: 752,958

[22] Filed: Nov. 20, 1996

[30] Foreign Application Priority Data

Nov. 20, 1995 [JP] Japan ................................. 7-301469

[51] Int. Cl.⁶ .................................................. G02B 6/28
[52] U.S. Cl. ............................................ 359/341; 359/134
[58] Field of Search ................................ 359/341, 134, 359/345; 372/6

[56] References Cited

U.S. PATENT DOCUMENTS

| | | | |
|---|---|---|---|
| 5,050,949 | 9/1991 | DiGiovanni et al. | 359/341 |
| 5,623,362 | 4/1997 | Mitsuda et al. | 359/341 |
| 5,640,269 | 6/1997 | Shigematsu et al. | 359/341 |
| 5,664,131 | 9/1997 | Sugiya | 359/341 |

OTHER PUBLICATIONS

Kashiwada et al, "Gain–Flattened Optical–Fiber Amplifiers With a Hybrid Er–Doped–Fiber Configuration for WDM Transmission", OFC '95 Technical Digest, pp. 77 and 78.
Nakazato et al, "Four Channel 2.5Gbit/s WDM Transmission Over 509km Using Gain–Flattened Hybrid In–Line EDFAs", Proc. 21st Eur. Conf. on Opt. Comm. (ECOC'95–Brussels), pp. 925–928.

Mitsuda et al, "Output–Power and Noise Figure Characteristics of 0.98 μm/1.48 μm Hybrid Pumped Erbium–Doped Fiber Amplifier", Technical Report of IEICE, EMD 93–34, CMP 93–47, OQE 93–68 (1993–08), pp. 1–6.

Chen, "Measuring Emission Cross–Section Profile of Erbium–Doped Fibre With low Input Power", Electronics Letters, May 26, 1994, vol. 30, No. 11, pp. 889–891.

*Primary Examiner*—Mark Hellner
*Attorney, Agent, or Firm*—Cushman Darby & Cushman IP Group of Pillsbury Madison & Sutro LLP

[57] ABSTRACT

This invention relates to an optical fiber amplifier for amplifying and outputting input signal light. The optical fiber amplifier includes first to third amplification optical fibers. The first to third optical fibers are arranged such that the signal light passes through the first to third optical fibers in the order named. A first value as the (emission cross-section)/(absorption cross-section) of the first optical fiber and a third value as the (emission cross-section)/(absorption cross-section) of the third optical fiber are set to be larger than a second value as the (emission cross-section)/(absorption cross-section) of the second optical fiber. With this arrangement, low noise can be achieved in the first optical fiber, and a large output can be achieved in the third optical fiber. In addition, the gain characteristics associated with wavelength in this optical fiber amplifier as the overall transmission line including the first, second, and third amplification optical fibers can be sufficiently flattened.

22 Claims, 21 Drawing Sheets

OPTICAL FIBER AMPLIFIER

BACKGROUND OF THE INVENTION

1. Field of the Invention

The present invention relates to an optical fiber amplifier having a flattened gain spectrum and applied to an optical communication system or the like.

2. Related Background Art

An optical fiber amplifier for receiving light (pumping light) as an operating energy, and amplifying and outputting the received signal light is mainly used in an optical communication system. An optical fiber amplifier using an optical fiber doped with a rare earth element such as Er, in particular, has excellent characteristics in terms of speed and noise, and hence has been vigorously studied and developed.

In a conventional optical fiber amplifier using one amplification optical fiber, as a wavelength-division-multiplexed (WDM) signal is amplified, the gain tends to increase toward the long-wavelength region, and the resultant gain deviation between signal light beams having different wavelengths poses a problem.

In order to solve this problem, optical fiber amplifiers have been proposed in T. Kashiwada et al., OFC '95 Technical Digest, TuP1, pp. 77–78 (prior art 1); K. Nakazato et al., Proc. 21st Eur. Conf. on Opt. Comm. (ECOC '95—Brussels), pp. 925–298 (prior art 2); and M. Mitsuda et al., Technical Report of IEICE, EMD 93-34, CMP 93-47, OQE 93-68 (1993-08) (prior art 3). In each optical fiber amplifier, a second amplification optical fiber whose gain decreases toward the long-wavelength region is continuously connected to a first amplification optical fiber whose gain increases toward the long-wavelength region. With this structure, the overall gain characteristics of the amplifier are made flat.

According to prior art 1, the first and second amplification optical fibers are arranged such that signal light passes through the second amplification optical fiber and the first amplification optical fiber in the order named. The first amplification optical fiber is an erbium-doped optical fiber codoped with aluminum (to be referred to as an Al-codoped EDF hereinafter) in which a higher gain is obtained in a long-wavelength region than in a short-wavelength region. The second amplification optical fiber is an erbium-doped optical fiber codoped with phosphor and aluminum (to be referred to as a P-Al-codoped EDF hereinafter) in which a lower gain is obtained in a long-wavelength region than in a short-wavelength region. The Al-codoped EDF and the P-Al-codoped EDF are directly and optically connected to each other. Both the amplification optical fibers are pumped by pumping light having a wavelength of 1.48 µm. In prior art 1, changes in gain due to changes in wavelength are made flat and an increase in output is attained by adjusting the lengths of the Al-codoped EDF and the P-Al-codoped EDF.

According to prior art 2, the first and second amplification optical fibers are arranged such that signal light passes through the first amplification optical fiber and the second amplification optical fiber in the order named. The second amplification optical fiber is a P-Al-codoped EDF. The first amplification optical fiber is an Al-codoped EDF. The P-Al-codoped EDF and the Al-codoped EDF are optically connected to each other through an optical isolator. Both the amplification optical fibers are pumped by pumping light having a wavelength of 1.48 µm. In prior art 2, spontaneous emission light produced and amplified by the P-Al-codoped EDF is prevented from being incident on the Al-codoped EDF to attain a reduction in noise. Similar to prior art 1, prior art 2 is designed to make changes in gain due to changes in wavelength flat by adjusting the lengths of the Al-codoped EDF and the P-Al-coded EDF.

According to prior art 3, two identical erbium-doped optical fibers are optically connected to each other through an optical isolator to realize a low-noise, large-output optical fiber amplifier. In prior art 3, pumping light for the amplification optical fiber through which signal light passes first has a wavelength of 0.98 µm, and pumping light for the amplification optical fiber through which the signal light passes next mainly has a wavelength of 1.48 µm.

SUMMARY OF THE INVENTION

An object of the present invention is to provide a low-noise, large-output optical fiber amplifier whose gain characteristics with respect changes in wavelength are sufficiently flattened.

The present inventors examined the above conventional amplifiers and found the following problems.

When the (emission cross-section)/(absorption cross-section) of a conventional Al-codoped EDF is compared with that of a conventional P-Al-codoped EDF, it is found that the (emission cross-section)/(absorption cross-section) of the Al-codoped EDF per unit length is larger. Note that an erbium-doped optical fiber codoped with only phosphorus (P-codoped EDF) exhibits the same tendency as the P-Al-codoped EDF. For this reason, a hybrid optical fiber amplifier (hybrid EDFA) with the above-mentioned arrangement can be constituted by a P-codoped EDF and an Al-codoped EDF instead of a P-Al-codoped EDF.

As the (emission cross-section)/(absorption cross-section) increases, the EDF has better noise characteristics. In addition, the amplification efficiency of the EDF can be improved, and the intensity of an output signal can be increased under a constant pumping light power and a constant length.

The noise characteristics of such a hybrid optical fiber amplifier are determined by the noise characteristics of the upstream EDF (through which signal light passes first). The maximum signal light output of the hybrid optical fiber amplifier is determined by the amplification characteristics of the downstream EDF (through which the signal light passes last).

For this reason, in the arrangement in which the P-Al-codoped EDF is placed upstream, and the Al-codoped EDF is placed downstream, as in prior art 1, it is difficult to realize low noise, although a large output can be attained. Even if an optical isolator is placed between the P-Al-codoped EDF and the Al-codoped EDF to reduce the noise, the noise characteristics and the flattening of the gain characteristics cannot be attained for the following reason.

In order to make the gain characteristics with respect to the wavelength of signal light flat, the lengths of the P-Al-codoped EDF and the Al-codoped EDF must be optimized. However, in order to attain a reduction in noise, the length of the upstream P-Al-codoped EDF needs to be longer. As a result, the gain in the long-wavelength region inevitably becomes lower, and hence the flatness of the overall gain characteristics of the hybrid EDFA deteriorates.

In the arrangement in which the Al-codoped EDF is placed upstream, and the P-Al-codoped EDF is placed downstream, as in prior art 2, it is difficult to realize a large output, although low noise can be attained. If the P-Al-codoped EDF is elongated to increase the output, the gain on the long-wavelength side decreases. As a result, the flatness of the overall gain characteristics of the hybrid EDFA deteriorates.

Even if both pumping light having a wavelength of 0.98 μm and pumping light having a wavelength of 1.48 μm are used to attain both low noise and a large output, as in prior art 3, the same problems as those described above are posed. It is therefore difficult to realize low noise, a large output, and sufficiently flattened gain characteristics at the same time.

In order to solve the above problems, an optical fiber amplifier of the present invention includes a first amplification section for amplifying and outputting signal light (input light) having a wavelength in a predetermined wavelength region, a second amplification section for receiving the signal light output from the first amplification section and outputting the amplified signal light, and a third amplification section for receiving the signal light output from the second amplification section and outputting the amplified signal light.

For example, as shown in FIG. 1, the first amplification section includes a first amplification optical fiber 110 and has a first gain in the predetermined wavelength region including the above wavelength of signal light. The first amplification optical fiber 110 receives the signal light together with first pumping light having a first wavelength, and amplifies the signal light. The first amplification optical fiber 110 has a first value as a ratio of its emission cross-section to its absorption cross-section. The second amplification section includes a second amplification optical fiber 120 and has a second gain in the predetermined wavelength region. The second amplification optical fiber 120 receives the signal light together with second pumping light having a second wavelength, and amplifies the signal light. The second amplification optical fiber 120 has a second value as a ratio of its emission cross-section to its absorption cross-section, which is smaller than the first value. The third amplification section includes a third amplification optical fiber 130 and has a third gain in the predetermined wavelength region. The third amplification optical fiber 130 receives the signal light together with third pumping light having a third wavelength, and amplifies the signal light. The third amplification optical fiber 130 has a third value as a ratio of its emission cross-section to its absorption cross-section, which is larger than the second value.

In the optical fiber amplifier of the present invention, with respect to changes in wavelength in the predetermined wavelength region including the wavelength of signal light, the overall gain spectrum of the optical fiber amplifier is flatter than each of the first, second, and third gain spectra. In this specification, the flatness of the gain spectrum with respect to changes in wavelength indicates the difference (absolute value) between the maximum and minimum gains in a predetermined wavelength region (e.g., 1,540 nm to 1,560 nm) including the wavelength of signal light (see FIGS. 1, 3, and 4).

An optical fiber amplifier according to the present invention uses three amplification optical fibers in such a manner that a first value as the (emission cross-section)/(absorption cross-section) of the first amplification optical fiber placed upstream (through which signal light passes first) and a third value as the (emission cross-section)/(absorption cross-section) of the third amplification optical fiber placed downstream (through which the signal light passes last) are set to be larger than a second value as the (emission cross-section) /(absorption cross-section) of the second amplification optical fiber placed between the first and third amplification optical fibers. With this arrangement, low noise can be achieved in the first amplification optical fiber placed upstream, and a large output can be achieved in the third amplification optical fiber placed downstream. In addition, changes in gain with respect to changes in wavelength in the overall structure (hybrid EDFA) constituted by the first, second, and third amplification optical fibers can be sufficiently flattened.

In this case, the first gain spectrum in the predetermined wavelength has a slope with a first sign (positive or negative) with respect to changes in wavelength, and the third gain spectrum in the predetermined wavelength region has a slope with the same sign as the first sign with respect to changes in wavelength. The second gain spectrum in the predetermined wavelength region has a slope with a second sign opposite to the first sign with respect to changes in wavelength. Such a relationship can be established while the first and third amplification optical fibers have the same composition (see FIGS. 3 and 4).

In the structure of the optical fiber amplifier according to the present invention, at least the first and third amplification optical fibers may be Al-codoped EDFs, and the second amplification optical fiber may be a P-codoped EDF. The second amplification optical fiber may be a P-Al-codoped EDF which is further codoped with aluminum. By setting the first and second signs to be positive and negative signs, respectively, the optical fiber amplifier according to the present invention can be properly realized (see FIGS. 3 and 4).

It is preferable that the optical fiber amplifier according to the present invention further comprise one or more optical isolators between a first amplification optical fiber 140 and a second amplification optical fiber 150, as shown in FIGS. 11 to 13 and 15. In this arrangement, the optical isolator prevents spontaneous emission light generated and amplified by the second amplification optical fiber 150 or a third amplification optical fiber 160 from being incident on the first amplification optical fiber 140, thereby attaining a further reduction in noise.

This optical fiber amplifier may further include a first directional optical coupler 220 placed between the first amplification optical fiber 140 (145) and the second amplification optical fiber 150. The first directional optical coupler 220 receives through a first terminal the light output from the first amplification optical fiber 140 (145) and outputs it from a second terminal, and also receives the first pumping light through a third terminal and outputs it from the first terminal to the first amplification optical fiber 140 (145). In this case, since the first wavelength can be set to about 0.98 μm, the noise characteristics of the first amplification optical fiber 140 (145) can be further improved, and the noise characteristics of the hybrid optical fiber amplifier can be improved.

In this optical fiber amplifier, one optical isolator 330 may be placed between the first and second amplification optical fibers 140 (145) and 150, and a dispersion compensating optical fiber (included in the optical part 510 in FIGS. 11 to 13 and 15) may be placed between the optical isolator 330 and the second amplification optical fiber 150. In addition, a plurality of optical isolators 330 and 340 may be arranged between the first and second amplification optical fibers 140 (145) and 150, and the dispersion compensating optical fiber may be placed between the adjacent optical isolators.

In addition, in this optical fiber amplifier, one optical isolator may be placed between the first and second amplification optical fibers 140 (145) and 150, and a wavelength selection filter 520 (see FIGS. 13 and 15) may be placed between the optical isolator 330 and the second amplification optical fiber 150. Alternatively, a plurality of optical isolators 330 and 340 can be arranged between the first and second amplification optical fibers 140 (145) and 150, and the wavelength selection filter 520 may be placed between the adjacent optical isolators 330 and 340 (see FIG. 15).

Furthermore, in this optical fiber amplifier, one optical isolator may be placed between the first and second amplification optical fibers 140 (145) and 150, and a demultiplexing optical coupler (included in the optical part 510 in FIGS. 11 to 13 and 15) may be placed between the optical isolator 330 and the second amplification optical fiber 150. Alternatively, a plurality of optical isolators 330 and 340 can be arranged between the first and second amplification optical fibers 140 (145) and 150, and the demultiplexing optical coupler may be placed between the adjacent optical isolators 330 and 340.

When the optical part 510 is inserted between the first and second amplification optical fibers 140 (145) and 150, the optical isolator 330 prevents noise light produced by the optical part 510 from being incident on the first amplification optical fiber 140. A reduction in noise can therefore be attained. The optical isolator 340 prevents pumping light from being incident on the optical part 510 when backward pumping is performed for the second and third amplification optical fibers 150 and 160, or bidirectional pumping (including both backward pumping and forward pumping) is performed.

As shown in FIGS. 20 and 21, this optical fiber amplifier preferably further includes one or more optical isolators between the second amplification optical fiber 180 and a third amplification optical fiber 190.

In this optical fiber amplifier, since the optical isolator prevents spontaneous emission light generated and amplified by the third amplification optical fiber 190 from being incident on first or second amplification optical fiber 170 or 180, a further reduction in noise can be attained.

In this case, the first pumping light may be identical to the second pumping light (see FIG. 20). This optical fiber amplifier may further include a second directional optical coupler 210 placed between the second and third amplification optical fibers 180 and 190. The second directional optical coupler 210 receives through a first terminal the light output from the second amplification optical fiber 180 and outputs it from a second terminal, and also receives the first pumping light through a third terminal and outputs it from the first terminal to the second amplification optical fiber 180.

In this optical fiber amplifier, one optical isolator 330 may be placed between the second and third amplification optical fibers 180 and 190, and a dispersion compensating optical fiber (included in the optical part 510 in FIGS. 20 and 21) may be placed between the optical isolator 330 and the third amplification optical fiber 190. Alternatively, a plurality of optical isolators 180 and 190 may be arranged between the second and third amplification optical fibers 180 and 190, and a dispersion compensating optical fiber may be placed between the adjacent optical isolators 330 and 340 (see FIGS. 20 and 21).

In addition, in this optical fiber amplifier, one optical isolator 330 may be placed between the second and third amplification optical fibers 180 and 190, and a wavelength selection filter 520 (see FIG. 21) may be placed between the optical isolator 330 and the third amplification optical fiber 190. Alternatively, a plurality of optical isolators 330 and 340 may be arranged between the second and third amplification optical fibers 180 and 190, and a wavelength selection filter 520 may be placed between the adjacent optical isolators 330 and 340 (see FIG. 21).

Furthermore, in this optical fiber amplifier, one optical isolator 330 may be placed between the second and third amplification optical fibers 180 and 190, and a demultiplexing optical coupler (included in the optical part 510 in FIGS. 20 and 21) may be placed between the optical isolator 330 and the third amplification optical fiber 190. Alternatively, a plurality of optical isolators 330 and 340 may be arranged between the second and third amplification optical fibers 180 and 190, and a demultiplexing optical coupler may be placed between the adjacent optical isolators 330 and 340 (FIG. 21).

When the optical part 510 is inserted between the second and third amplification optical fibers 180 and 190, since the optical isolator 330 prevents noise light produced by the optical part 510 from being incident on the first and second amplification optical fibers 170 and 180, a reduction in noise can be attained. In addition, the optical isolator 340 prevents backward pumping light for the third amplification optical fiber 190 from being incident on the optical part 510.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

Figure 1:
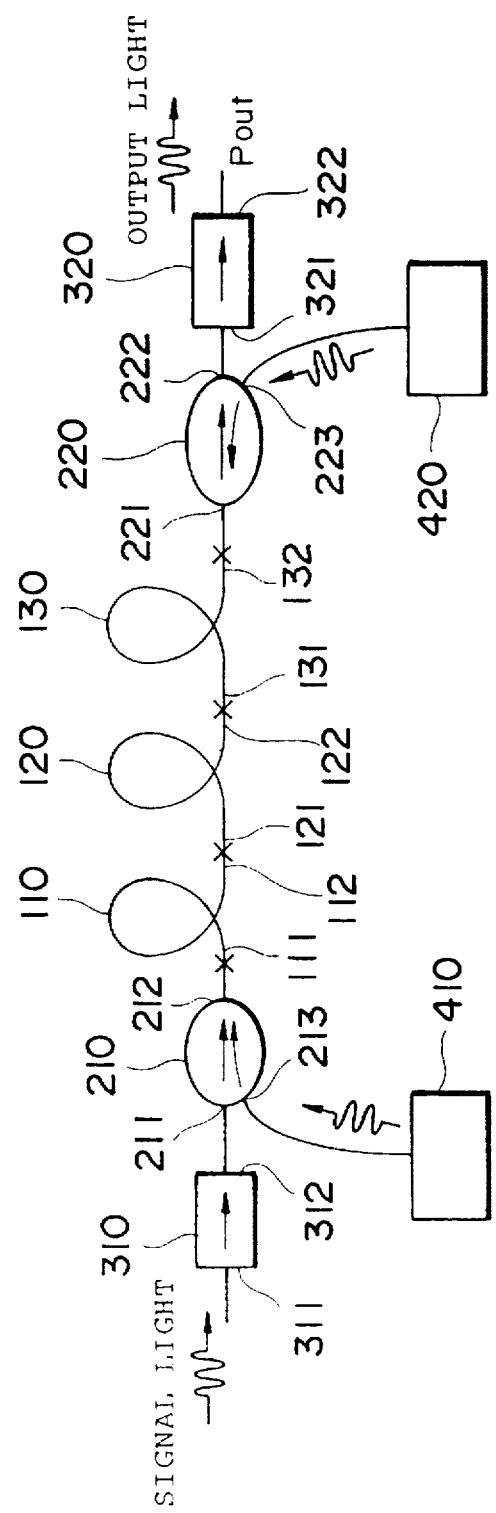
FIG. 1 is a block diagram showing the structure of an optical fiber amplifier according to a first embodiment (Embodiment 1) of the present invention.

The embodiments of the optical fiber amplifier of the present invention will be described below with reference to the accompanying drawings. The same reference numerals denote the same parts throughout the drawings, and a repetitive description will be avoided.

Embodiment 1

FIG. 1 shows the structure of an optical fiber amplifier according to a first embodiment (Embodiment 1) of the present invention. As shown in FIG. 1, this hybrid optical fiber amplifier (hybrid EDFA) includes (a) an optical isolator 310 which receives signal light through a terminal 311 and outputs it from a terminal 312, but does not output light incident from the terminal 311 on the terminal 312, (b) a WDM coupler 210 which receives through a terminal 211 the signal light output from the optical isolator 310 and outputs it from a terminal 212, and also receives pumping light having a wavelength of 1.48 μm through a terminal 213 and outputs it from the terminal 212, (c) an Al-codoped EDF 110 which receives through a terminal 111 the light (including the signal light) output from the terminal 212 of the WDM coupler 210, amplifies the signal light, and outputs it from a terminal 112, (d) a P-Al-codoped EDF 120 which receives through a terminal 121 the light (including the signal light) output from the terminal 112 of the Al-codoped EDF 110, amplifies the signal light, and outputs it from a terminal 122, (e) an Al-codoped EDF 130 which receives through a terminal 131 the light (including the signal light) output from the terminal 122 of the P-Al-codoped EDF 120, amplifies the signal light, and outputs it from a terminal 132, (f) a WDM coupler 220 which receives through a terminal 222 the light (including the signal light) output from the terminal 132 of the Al-codoped EDF 130, receives pumping light having a wavelength of 1.48 μm through a terminal 223, and outputs it from a terminal 221, (g) an optical isolator 320 which receives through a WDM coupler 321 the light (including the signal light) output from the terminal 222 of the WDM coupler 220, and outputs it from a terminal 322, but does not output light incident from the WDM coupler 321 on the terminal 322, (h) a light source 410 which generates pumping light having a wavelength of 1.48 μm and outputs it to the terminal 213 of the WDM coupler 210, and (i) a light source 420 which generates pumping light having a wavelength of 1.48 μm and outputs it to the terminal 223 of the WDM coupler 220.

Assume that the specifications of the optical fiber amplifier in FIG. 1 include that the amplifier amplifies four wavelength-multiplexed signals (respectively having channel wavelengths of 1.543 μm, 1.548 μm, 1.553 μm, and 1.558 μm) having an optical power of −18 dBm/channel to at least +9 dBm/channel or more. Table 1 shows the specifications of the Al-codoped EDFs 110 and 130. Table 2 shows the specifications of the P-Al-codoped EDF 120.

TABLE 1

| Core Diameter | about 3 μm |
|---|---|
| Er Doped Region Size | about ¾ of core (partial doping) |
| Relative Refractive Index Difference ($\Delta_n$) between | 2% |

TABLE 1-continued

| | |
|---|---|
| Core and Cladding Transmission Loss ($\alpha_{1.53}$) at 1.53 μm | 5.2 dB/m |
| Background Loss ($\alpha_{1.2}$) at 1.2 μm | 9 dB/km |
| Cutoff Wavelength ($\lambda c$) | 1.3 μm |
| Mode Field Diameter (MFD) at 1.55 μm | 3.8 μm |
| Al Concentration | 1.4 wt. % |

TABLE 2

| | |
|---|---|
| Core Diameter | about 3 μm |
| Er Doped Region Size | about ¾ of core (partial doping) |
| Relative Refractive Index Difference ($\Delta_n$) between Core and Cladding | 2% |
| Transmission Loss ($\alpha_{1.53}$) at 1.53 μm | 4.4 dB/m |
| Background Loss ($\alpha_{1.2}$) at 1.2 μm | 54 dB/km |
| Cutoff Wavelength ($\lambda c$) | 1.2 μm |
| Mode Field Diameter (MFD) at 1.55 μm | 4.5 μm |
| Al Concentration | 0.3 wt. % |
| P Concentration | 3.9 wt. % |

Figure 2:
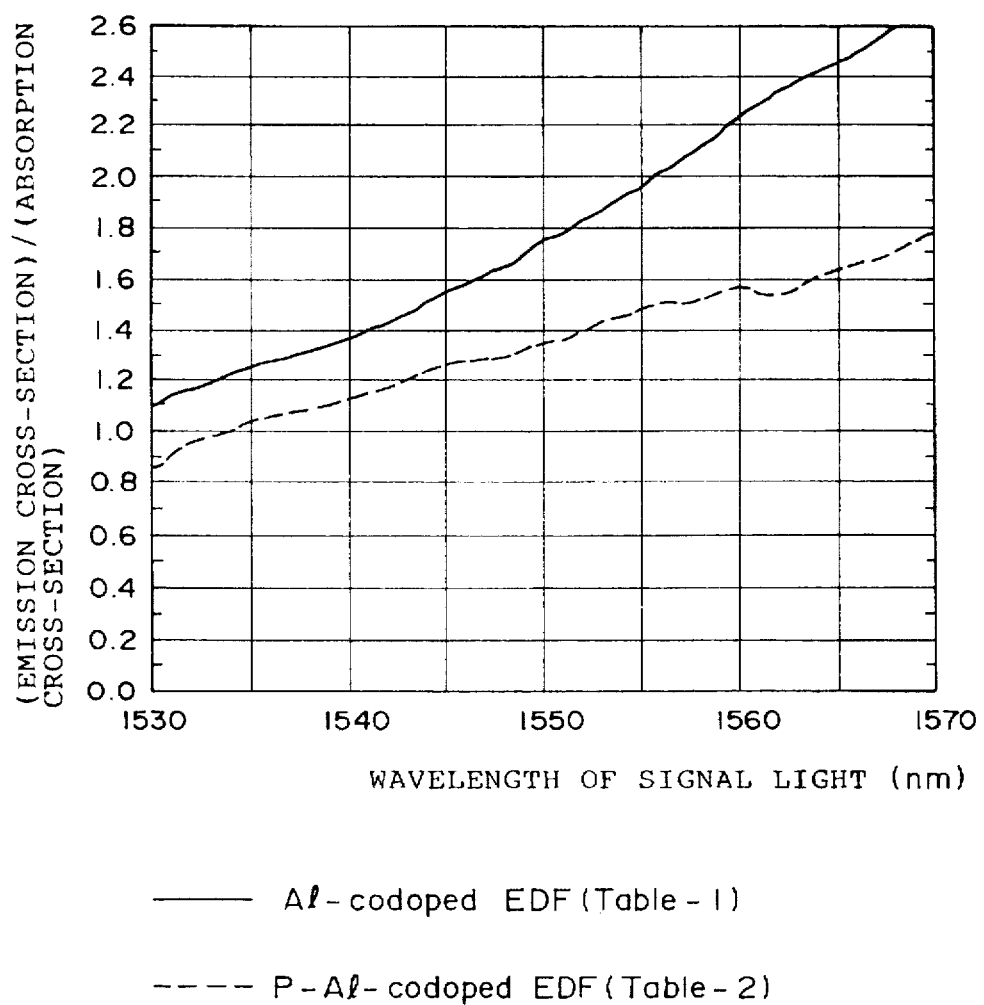
FIG. 2 is a graph showing the relationship between the wavelength of signal light and the (emission cross-section) /(absorption cross-section) of each of Al-codoped and P-Al-codoped EDFs.

FIG. 2 is a graph showing the relationship between the wavelength of signal light and the (emission cross-section)/(absorption cross-section) in relation to each of the Al-codoped and P-Al-codoped EDFs.

When the optical fiber amplifier in FIG. 1 is fabricated with the flatness of the gain spectrum being optimized under the above conditions, the Al-codoped EDF 110 has a length of 7 m; the P-Al-codoped EDF 120, 7 m; and the Al-codoped EDF 130, 12 m.

Figure 3:
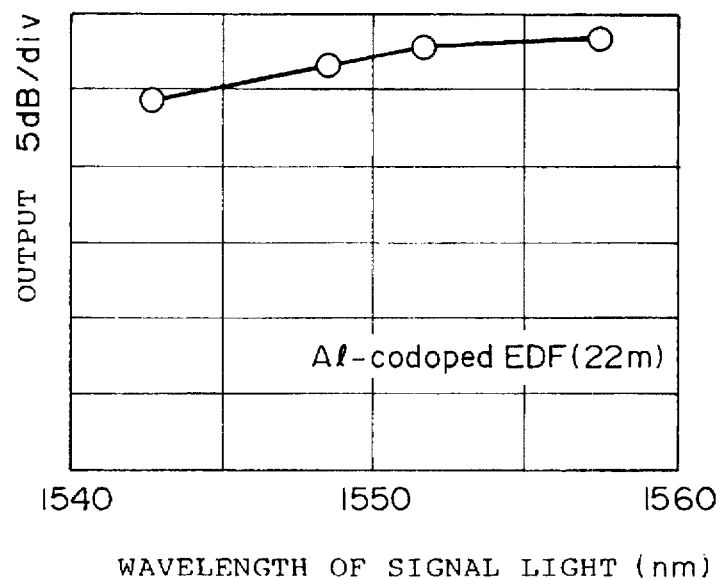
FIG. 3 is a graph showing the relationship between the wavelength of signal light (included in a predetermined wavelength region) and the output spectrum of an Al-codoped EDF.
Figure 4:
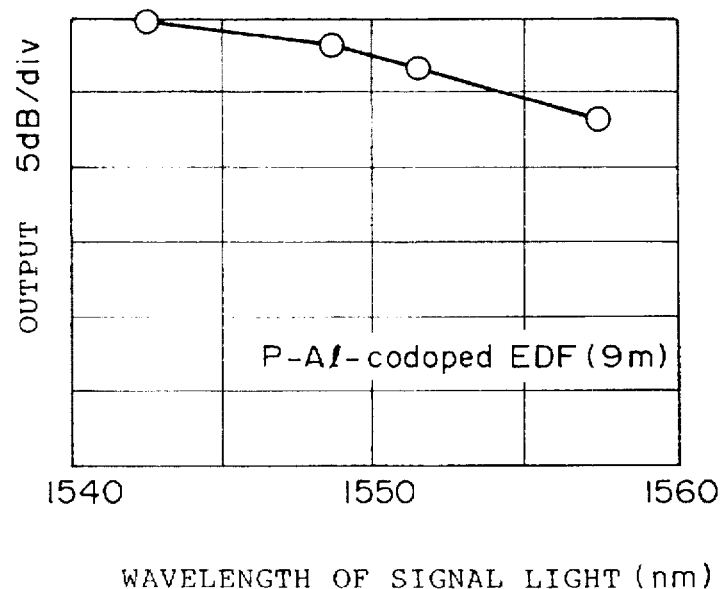
FIG. 4 is a graph showing the relationship between the wavelength of signal light (included in the predetermined wavelength region) and the output spectrum of a P-Al-codoped EDF.

FIGS. 3 and 4 are graphs showing the output spectra of an Al-codoped EDF (22 m) and a P-Al-codoped EDF (9 m) in a predetermined wavelength region. In order to measure these characteristics, four wavelength-multiplexed signals are input with −15 dBm of total input power (see T. Kashiwada et al., OFC '95 Technical Digest, TuP1, pp. 77–78). As is apparent from these graphs as well, the Al-codoped EDF has a gain characteristic of increasing its gain from a short-wavelength region to a long-wavelength region (having a positive slope rising from the short-wavelength region to the long-wavelength region), and the P-Al-codoped EDF has a gain characteristic of decreasing its gain from a short-wavelength region to a long-wavelength region (having a negative slope falling from the short-wavelength region to the long-wavelength region). In this specification, the flatness of the gain spectrum with respect to changes in wavelength is defined by the difference (absolute value) between the maximum output power and the minimum output power in a predetermined wavelength region (e.g., 1.540 nm to 1.560 nm).

A method of measuring the emission cross-section and absorption cross-section of an amplification optical fiber (EDF) will be described next. It is generally known that an emission cross-section $\sigma_e(\lambda)$ and an absorption cross-section $\sigma_a(\lambda)$ of an EDF respectively correspond to the gain coefficient and absorption coefficient of the EDF.

Figure 5:
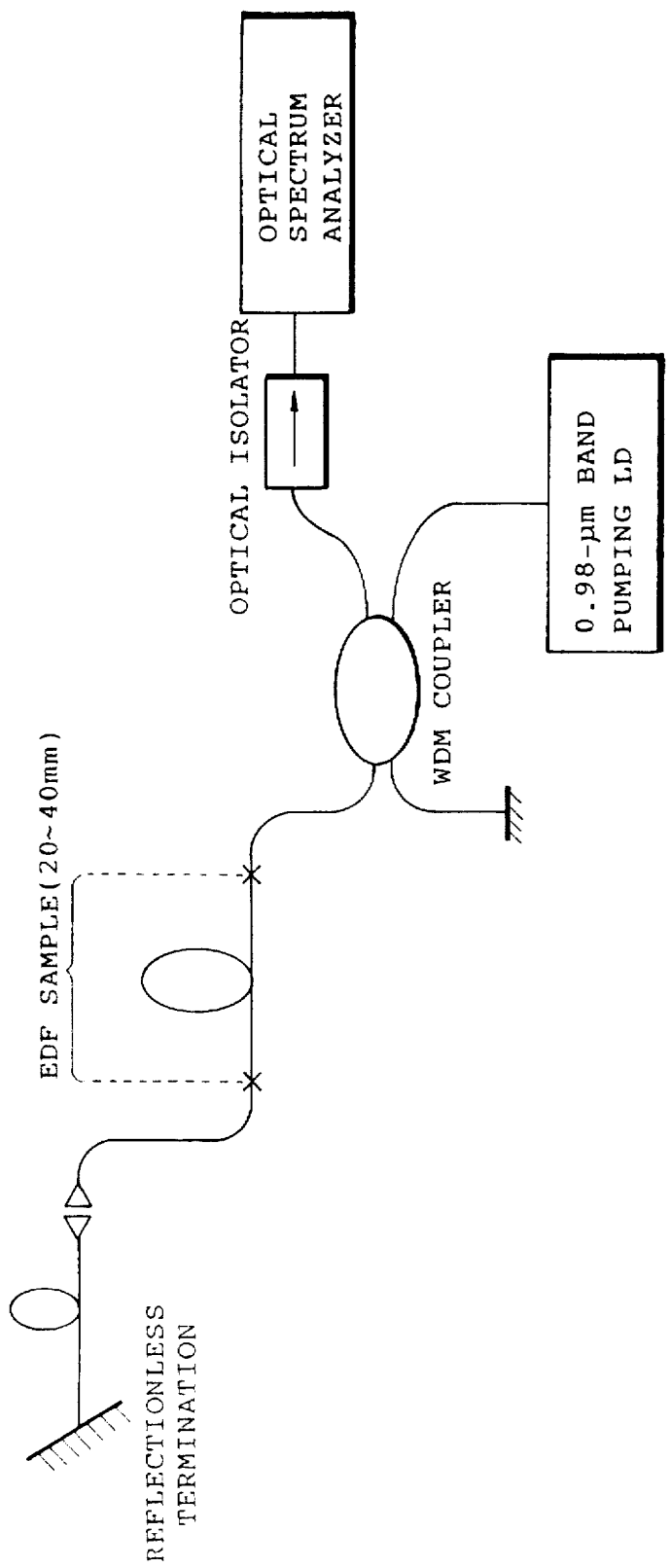
FIG. 5 is a block diagram showing the structure of an experimental apparatus for measuring the emission cross-section of an amplification optical fiber (EDF)

FIG. 5 shows the structure of an experimental apparatus for measuring the emission cross-section of an amplification optical fiber. This experimental apparatus inputs pumping light having a wavelength of 0.98 μm from a laser diode (LD) to one end of an EDF sample through a WDM coupler, and measures the output intensity of spontaneous emission light output from one end of the EDF sample with an optical spectrum analyzer through the WDM coupler and an isolator. Note that the other end of the EDF sample is optically coupled to a reflectionless termination to prevent the optical spectrum analyzer from detecting the reflected light of the spontaneous emission light output from the other end of the EDF sample.

When the emission cross-section $\sigma_e(\lambda)$ with respect to each wavelength $\lambda$ is to be measured, an EDF sample having a length L (20 to 40 mm) which is short enough to prevent amplification is prepared. This EDF sample is pumped by pumping light having a wavelength of 0.98 μm. The spectrum of the spontaneous emission light output from the pumped EDF sample is measured with the optical spectrum analyzer. The emission cross-section $\sigma_e(\lambda)$ is obtained on the basis of the measured value (spontaneous emission power: $P_{SE}(\lambda)$), a density $N_0$ of all the $Er^{3+}$ ions in the EDF sample, and a confinement factor $\Gamma$ of the EDF sample. More specifically, the emission cross-section $\sigma_e(\lambda)$ was obtained according to equation (1) below, which is written in C. Y. Chen, et al., ELECTRONICS LETTERS, 26th May 1994, Vol. 30, No. 11, pp. 889–891:

$$P_{SE}(\lambda) = \sigma_e(\lambda) \cdot N_2 \cdot \Gamma \cdot h\nu\Delta\nu \cdot L \quad (1)$$

where $h\nu\Delta\nu$ is the power of light emitted per unit time, and $N_2$ is the density of $Er^{3+}$ ions at the excitation level. Note that since the $Er^{3+}$ ions pumped by pumping light in a band of 0.98 μm are at the third energy level, $N_2 = N_0$ can be established (an ideal population inversion can be obtained) by a sufficiently strong pumping power.

Figure 6:
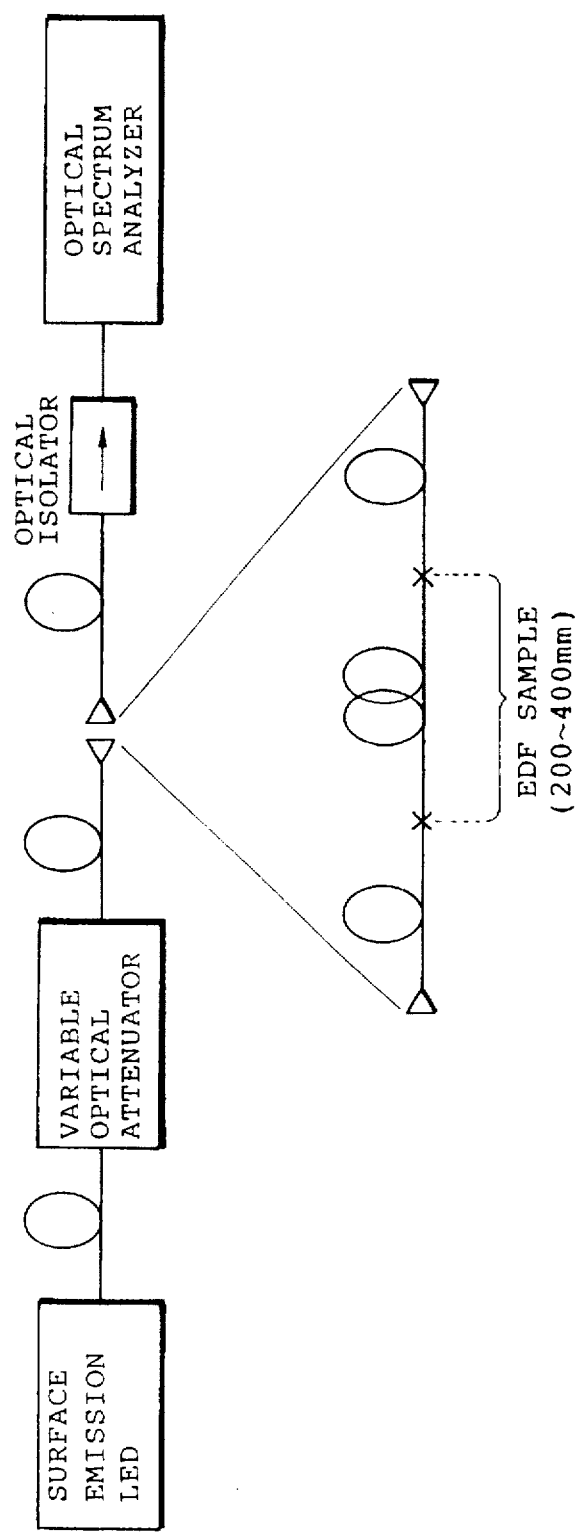
FIG. 6 is a block diagram showing the structure of an experimental apparatus for measuring the absorption cross-section of an amplification optical fiber (EDF)

FIG. 6 shows the structure of an experimental apparatus for measuring the absorption cross-section of the amplification optical fiber. This experimental apparatus inputs probe light from a surface emission light-emitting diode (LED) to one end of the EDF sample through a reflectionless variable optical attenuator, and measures the output intensity of the probe light having passed through the EDF sample through an isolator.

The absorption cross-section $\sigma_a(\lambda)$ with respect to each wavelength $\lambda$ is obtained as follows. An EDF sample having a length L (200 to 400 mm) is set in a non-pumped state, and probe light from the surface emission LED is incident on the sample. The absorptance of the EDF sample is then calculated according to equation (2):

$$P_{out} = P_{in} \cdot \exp(-\Gamma \cdot \sigma_a(\lambda) \cdot N_1 \cdot L) \quad (2)$$

where $P_{out}$ is the power of the probe light having passed through the EDF sample, $P_{in}$ is the power of the probe light incident on the EDF sample, and $N_1$ is the density of the $Er^{3+}$ ions in the EDF sample at the ground level. Note that in this experimental apparatus, since the EDF sample is not pumped, the density $N_0$ of all the $Er^{3+}$ ions in the EDF sample can be assumed to be substantially equal to the density $N_1$ of the $Er^{3+}$ ions at the ground level.

Figure 7:
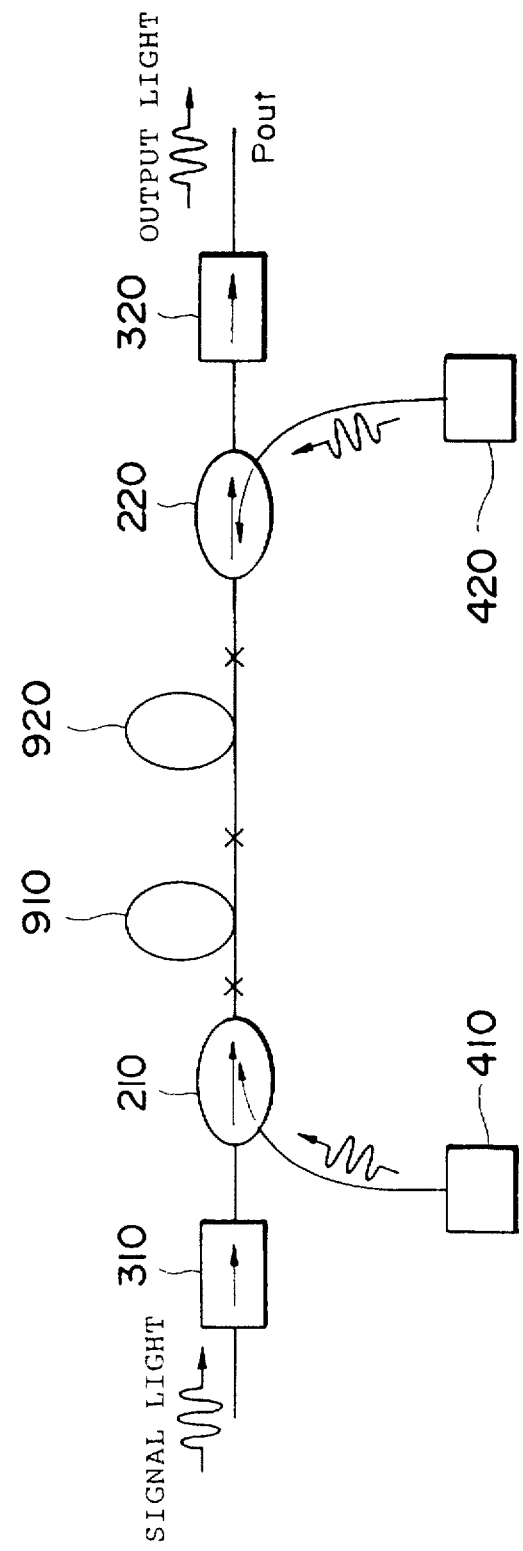
FIG. 7 is a block diagram showing the structure of a first comparative example (Comparative Example 1) whose optical transmission characteristics are measured to be compared with the optical transmission characteristics of the optical fiber amplifier (Embodiment 1) in FIG. 1.
Figure 8:
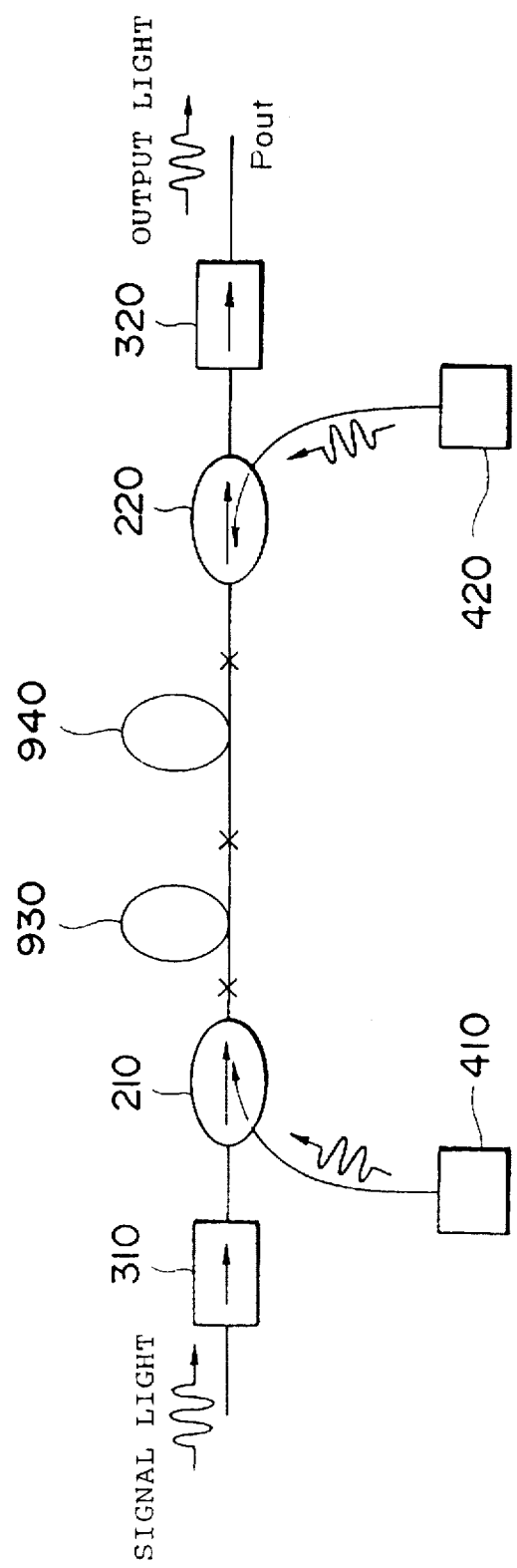
FIG. 8 is a block diagram showing the structure of a second comparative example (Comparative Example 2) whose optical transmission characteristics are measured to be compared with the optical transmission characteristics of the optical fiber amplifier (Embodiment 1) in FIG. 1.

FIGS. 7 and 8 respectively show the structures of first and second comparative examples (Comparative Examples 1 and 2) whose optical transmission characteristics have been measured to be compared with the optical transmission characteristics of the optical fiber amplifier in FIG. 1.

FIG. 7 shows the structure (Comparative Example 1) in which an Al-codoped EDF 910 with the specifications in Table 1 and a P-Al-codoped EDF 920 with the specifications in Table 2 are respectively arranged upstream and downstream in place of the combination of the Al-codoped EDF 110, the P-Al-codoped EDF 120, and the Al-codoped EDF 130 in the EDFA shown in FIG. 1. With this structure, the total length of the amplification optical fibers was set to be almost equal to that in the EDFA in FIG. 1, and the flatness of the gain spectrum was optimized, thereby forming an optical fiber amplifier. As a result, the Al-codoped EDF 910 had a length of 14 m, and the Al-codoped EDF 910 had a length of 12 m.

FIG. 8 shows the structure (Comparative Example 2) in which a P-Al-codoped EDF 930 with the specifications in Table 2 and an Al-codoped EDF 940 with the specifications in Table 1 are respectively arranged upstream and downstream in place of the combination of the Al-codoped EDF 110, the P-Al-codoped EDF 120, and the Al-codoped EDF 130 in the EDFA shown in FIG. 1. With this structure, the total length of the amplification optical fibers was set to be almost equal to that in the EDFA in FIG. 1, and the flatness of the gain spectrum was optimized, thereby forming an optical fiber amplifier. As a result, the P-Al-codoped EDF 930 had a length of 6 m, and the Al-codoped EDF 940 had a length of 12 m.

Figure 9:
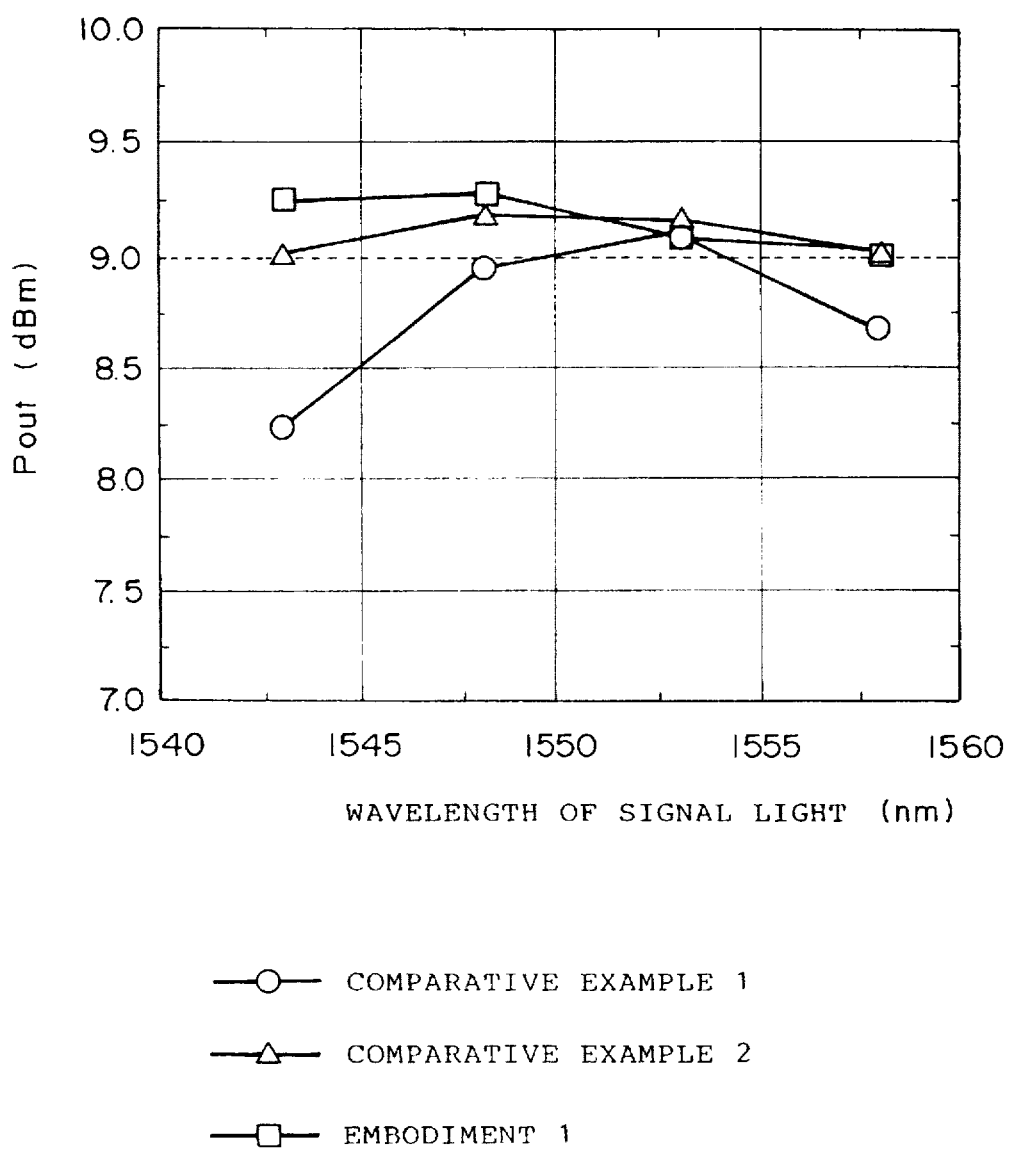
FIG. 9 is a graph showing the relationship between the wavelength of signal light and the output power as the optical transmission characteristics of each of the optical fiber amplifiers (Embodiment 1 and Comparative Examples 1 and 2) respectively shown in FIGS. 1, 7, and 8.
Figure 10:
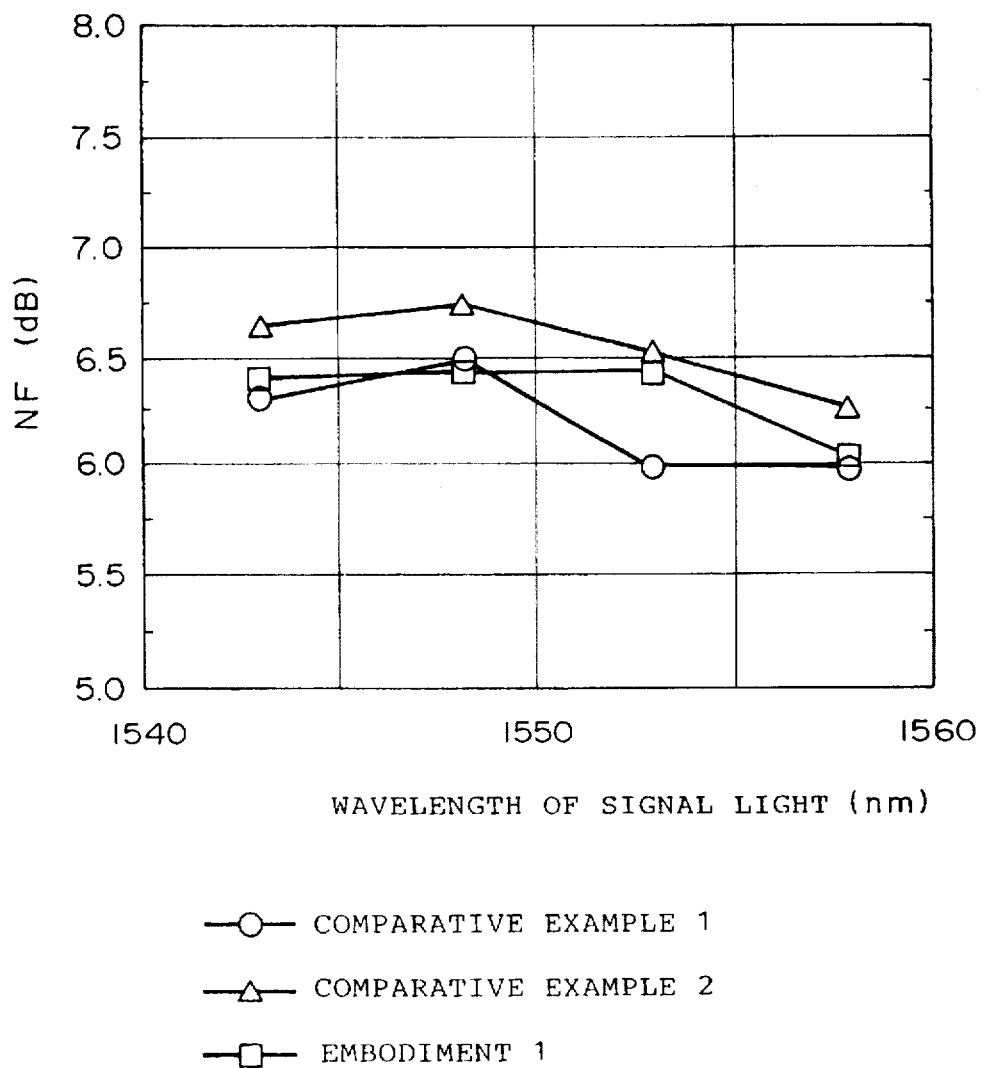
FIG. 10 is a graph showing the relationship between the wavelength of signal light and the noise figure (NF) as the optical transmission characteristics of each of the optical fiber amplifiers (Embodiment 1 and Comparative Examples 1 and 2) respectively shown in FIGS. 1, 7, and 8.

FIGS. 9 and 10 are graphs showing the optical transmission characteristics of Embodiment 1 (FIG. 1), Comparative Example 1 (FIG. 7), and Comparative Example 2 (FIG. 8). FIG. 9 shows the relationship between the wavelength of signal light and the output optical power. FIG. 10 shows the relationship between the wavelength of signal light and the noise figure (NF). As is apparent from FIG. 9, the optical fiber amplifiers of Embodiment 1 and Comparative Example 2 are superior to the remaining amplifier in attaining a large output and a sufficiently flattened gain spectrum. As is apparent from FIG. 10, the optical fiber amplifiers of Embodiment 1 and Comparative Example 1 are superior to the remaining amplifier in attaining a reduction in noise. It is therefore apparent from FIGS. 9 and 10 that the optical fiber amplifier in FIG. 1 is superior to the Comparative Examples 1 and 2, which are conventional optical fiber amplifiers, in attaining a large output, low noise, and a sufficiently flattened gain spectrum, i.e., in overall optical transmission characteristics.

Embodiment 2

Figure 11:
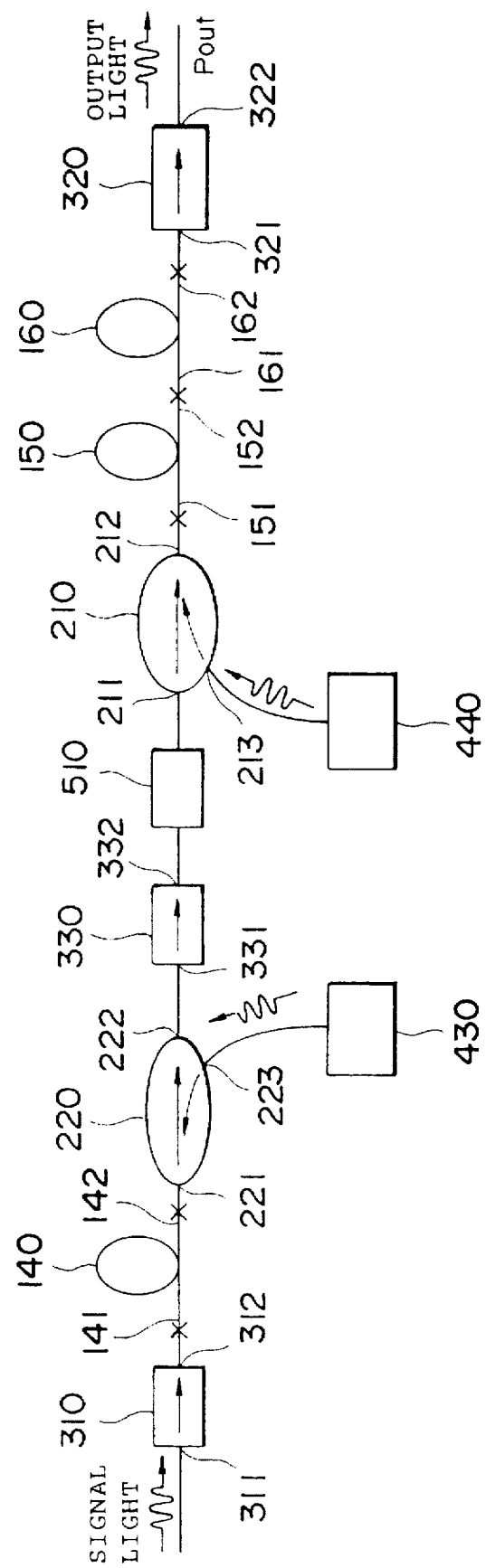
FIG. 11 is a block diagram showing the structure of an optical fiber amplifier according to a second embodiment (Embodiment 2) of the present invention.

FIG. 11 shows the structure of an optical fiber amplifier according to a second embodiment (Embodiment 2) of the present invention. As shown in FIG. 11, this hybrid EDFA includes (a) an optical isolator 310 which receives signal light through a terminal 311 and outputs it to a terminal 312, but does not output light incident from the terminal 311 on the terminal 312, (b) an Al-codoped EDF 140 which receives through a terminal 141 the light (including the signal light) output from the terminal 312 of the optical isolator 310, amplifies the signal light, and outputs it from a terminal 142, (c) a WDM coupler 220 which receives through a terminal 221 the light (including the signal light) output from the terminal 142 of the Al-codoped EDF 140 and outputs it from a terminal 222, and also receives pumping light having a wavelength of 1.48 μm through a terminal 223 and outputs it from the terminal 221, (d) an optical isolator 330 which receives through a terminal 331 the light (including the signal light) output from the terminal 222 of the WDM coupler 220 and outputs it from a terminal 332, but does not output light incident from the terminal 331 on the terminal 332, (e) an optical part 510 with a transmission loss which receives the light (including the signal light) output from the terminal 332 of the optical isolator 330, and outputs it, (f) a WDM coupler 210 which receives through a terminal 211 the light (including the signal light) output from the optical part 510 and outputs it from a terminal 212, and also receives pumping light having a wavelength of 1.48 μm from a terminal 213 and outputs it from the terminal 212, (g) a P-Al-codoped EDF 150 which receives through a terminal 151 the light (including the signal light) output from the terminal 212 of the WDM coupler 210, amplifies the signal light, and outputs it from a terminal 152, (h) an Al-codoped EDF 160 which receives through a terminal 161 the light output from the terminal 152 of the P-Al-codoped EDF 150, amplifies the signal light, and outputs it from a terminal 162, (i) an optical isolator 320 which receives through a terminal 322 the light (including the signal light) output from the terminal 162 of the Al-codoped EDF 160 and outputs it from a terminal 322, but does not output light incident from the WDM coupler 321 on the terminal 322, (j) a light source 430 which generates pumping light having a wavelength of 1.48 μm at an output of 50 mW, and outputs it to the terminal 223 of the WDM coupler 220, and (k) a light source 440 which generates pumping light having a wavelength of 1.48 μm at an output of 70 mW, and outputs it to the terminal 213 of the WDM coupler 210.

As the optical part 510, a dispersion compensating optical fiber or an optical demultiplexing coupler is available. Assume that the optical part 510 in the EDFA in FIG. 1 has a transmission loss of 8 dB.

Assume that the signal light in a 1.55-μm band, and the installed optical transmission line is a general single mode optical fiber having a zero-dispersion wavelength in a 1.3-μm band. In this case, a means for compensating for the dispersion is required. As such an optical part for dispersion compensation, a dispersion compensating optical fiber can be suitably used. A dispersion compensating optical fiber with FOM (Figure Of Merit)=230 ps/nm/dB is used as the optical part 510, provided that a transmission loss of 8 dB is allowed. In this case, a wavelength dispersion of up to 1,840 ps/nm can be compensated. Since the average wavelength dispersion of the general single mode optical fiber is 16.5 ps/nm/km, the relay zone can be extended to about 110 km without any deterioration in optical transmission characteristics due to wavelength dispersion.

With the recent rapid advances in the network configurations of optical communication systems, the need for demultiplexing has been increasing instead of the conventional simple relay techniques. When the optical part 510 is allowed to have a transmission loss of 8 dB, 1:6 demultiplexing can be performed. When, therefore, an optical demultiplexing coupler is used as the optical part 510, signal light can be sent to a maximum of five receivers near the optical demultiplexing coupler in addition to a relay operation.

Similar to the EDFA in FIG. 1, assume that the specifications of the optical fiber amplifier in FIG. 2 include that the amplifier amplifies four wavelength-multiplexed signals (respectively having channel wavelengths of 1.543 μm, 1.548 μm, 1.553 μm, and 1.558 μm) having an optical power of −18 dBm/channel to at least +9 dBm/channel or more. Table 1 shows the specifications of the Al-codoped EDF 140. Table 2 shows the specifications of the P-Al-codoped EDF 150.

When the optical fiber amplifier in FIG. 2 is fabricated with the flatness of the gain spectrum being optimized under the above conditions, the Al-codoped EDF 140 has a length of 10 m; the P-Al-codoped EDF 150, 4 m; and the Al-codoped EDF 160, 13 m.

Embodiment 3

Figure 12:
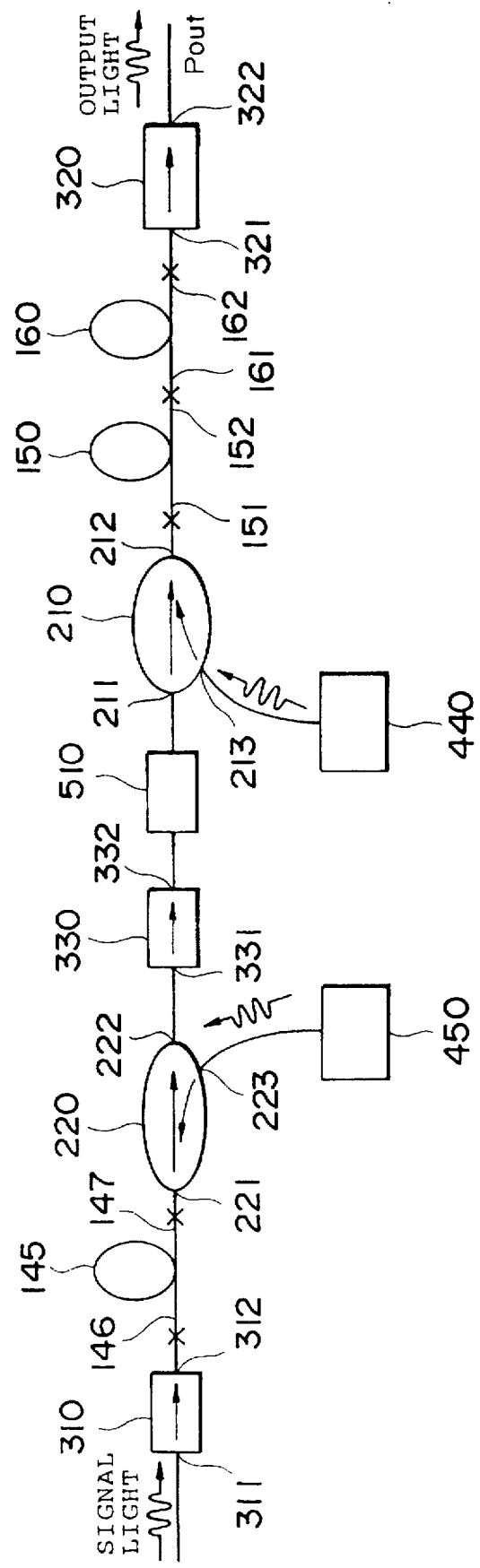
FIG. 12 is a block diagram showing the structure of an optical fiber amplifier according to a third embodiment (Embodiment 3) of the present invention.

FIG. 12 shows the structure of an optical fiber amplifier according to a third embodiment (Embodiment 3) of the present invention. As shown in FIG. 12, this hybrid EDFA differs from the hybrid EDFA in FIG. 11 only in that a light source 450 for generating pumping light having a wavelength of 0.98 μm at an output of 50 mW, and outputting the pumping light to a terminal 223 of a WDM coupler 220 is used in place of the light source 430 in the EDFA in FIG. 11, an Al-codoped EDF 145 having a cutoff wavelength of less than 0.98 μm, which is suitable for pumping light having a wavelength of 0.98 μm, is used in place of the Al-codoped EDF 140, and the Al-codoped EDF 145 is used as the first EDF which receives through a terminal 146 light (including signal light) output from a terminal 312 of an optical isolator 310, amplifies the signal light, and outputs it from a terminal 147. Assume that an optical part 510 has a transmission loss of 8 dB, as in the EDFA in FIG. 12.

Assume that the specifications of the optical fiber amplifier in FIG. 12 include that the amplifier amplifies four wavelength-multiplexed signals (respectively having channel wavelengths of 1.543 μm, 1.548 μm, 1.553 μm, and 1.558 μm) having an optical power of −18 dBm/channel to at least +9 dBm/channel or more. Table 3 shows the specifications of the Al-codoped EDF 145.

TABLE 3

| Core Diameter | about 2 μm |
|---|---|
| Er Doped Region Size | about ½ of core (partial doping) |
| Relative Refractive Index Difference ($\Delta_n$) between Core and Cladding | 1.7% |
| Transmission Loss ($\alpha_{1.53}$) at 1.53 μm | 3.7 dB/m |
| Background Loss ($\alpha_{1.2}$) at 1.2 μm | 3.5 dB/km |
| Cutoff Wavelength (λc) | 0.9 μm |
| Mode Field Diameter (MFD) at 1.55 μm | 4.8 μm |
| Al Concentration | 1.4 wt. % |

When the optical fiber amplifier in FIG. 12 is fabricated with the flatness of the gain spectrum being optimized under the above conditions, the Al-codoped EDF 145 has a length of 13 m.

Embodiment 4

Figure 13:
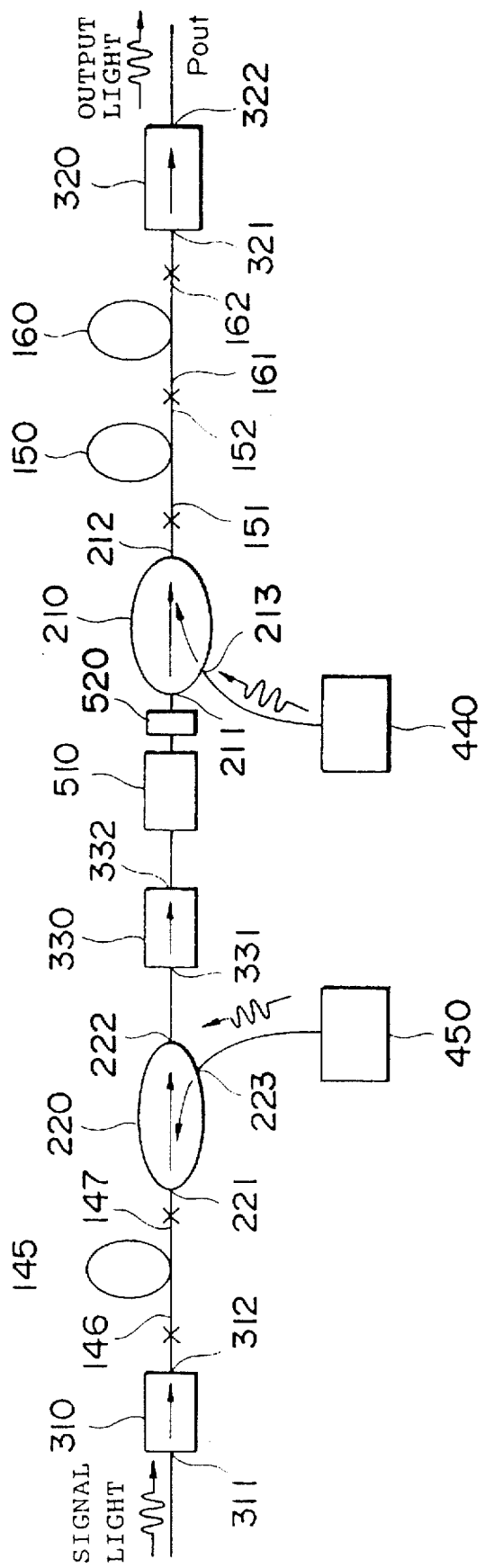
FIG. 13 is a block diagram showing the structure of an optical fiber amplifier according to a fourth embodiment (Embodiment 4) of the present invention.
Figure 14:
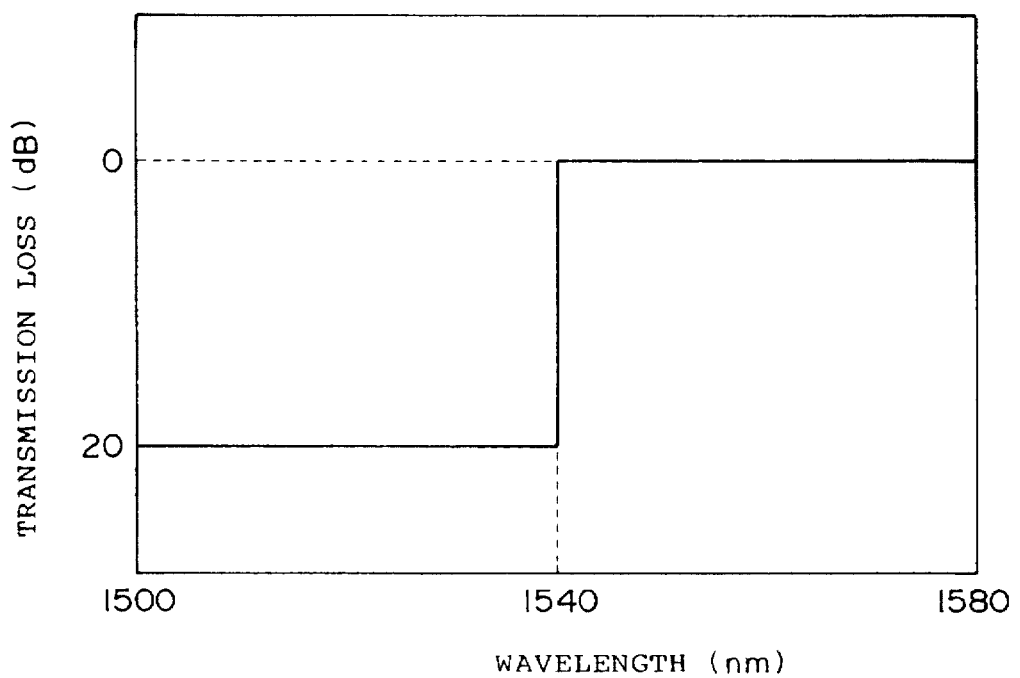
FIG. 14 is a graph showing the transmission characteristics of the optical filter (Embodiment 4) shown in FIG. 13.

FIG. 13 shows the structure of an optical fiber amplifier according to a fourth embodiment (Embodiment 4) of the present invention. As shown in FIG. 13, this hybrid EDFA differs from Embodiment 3 (FIG. 12) in that an optical filter 520 having transmission characteristics like those shown in FIG. 14 is placed downstream an optical part 510 to be adjacent thereto.

In each example described above, as shown in FIG. 15, a WDM coupler 230 which receives pumping light from a pumping light source 440 and outputs it to the P-Al-codoped EDF 150 and the Al-codoped EDF 160 may be placed downstream the EDFs 150 and 160 to perform backward pumping of the EDFs. In this case, by inserting the optical part 510 and the like between the optical isolator 330 and an optical isolator 340, incidence of the pumping light on the optical part 510 and the like can be prevented. Note that the WDM coupler 230 has first to third terminals 231 to 233, similar to the WDM coupler 220, and the optical isolator 340 has first and second terminals 341 and 342, similar to the optical isolator 330.

Figure 16:
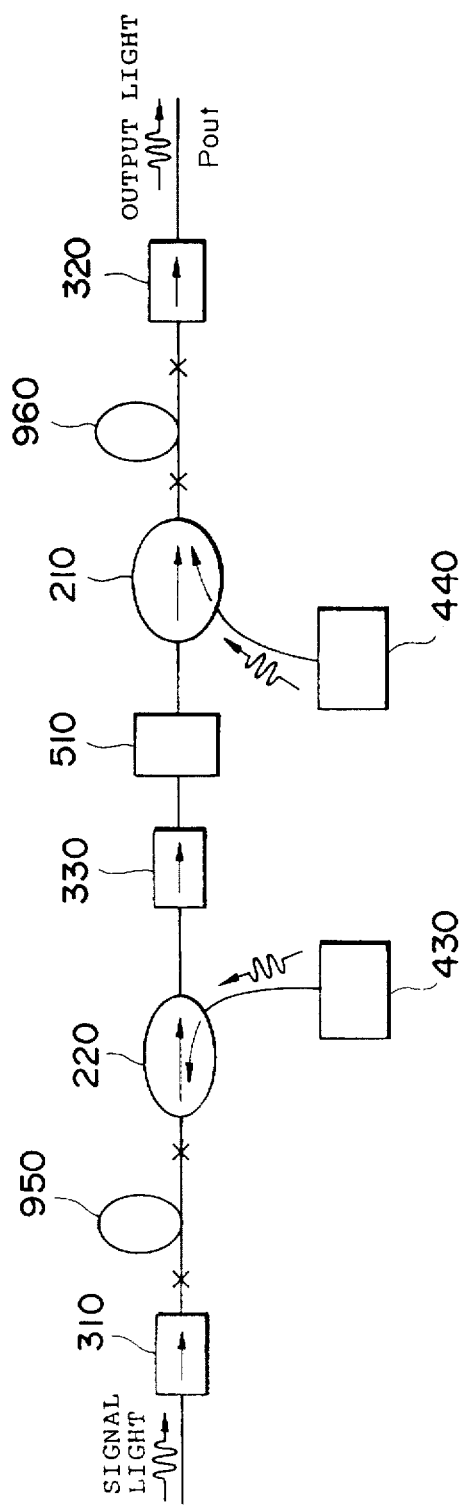
FIG. 16 is a block diagram showing the structure of a third comparative example (Comparative Example 3) whose optical transmission characteristics are measured to be compared with the optical transmission characteristics of each of the optical fiber amplifiers (Embodiments 2 to 4) respectively shown in FIGS. 11 to 13.
Figure 17:
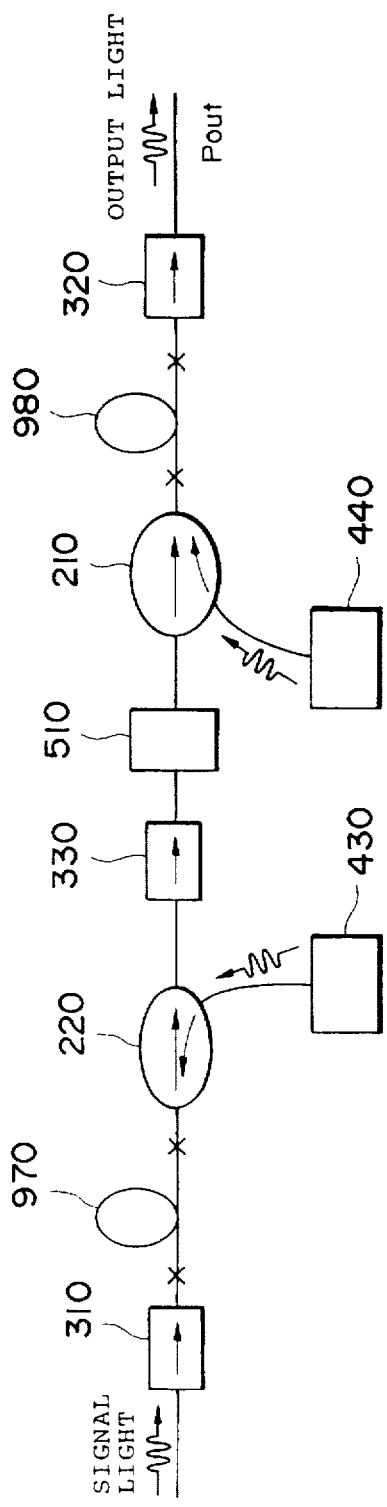
FIG. 17 is a block diagram showing the structure of a fourth comparative example (Comparative Example 4) whose optical transmission characteristics are measured to be compared with the optical transmission characteristics of each of the optical fiber amplifiers (Embodiments 2 to 4) respectively shown in FIGS. 11 to 13.

FIGS. 16 and 17 show the structures of third and fourth comparative example (Comparative Examples 3 and 4) whose optical transmission characteristics have been measured to be compared with the optical transmission characteristics of the optical fiber amplifiers (FIGS. 11 to 13) of Embodiments 2, 3, and 4.

FIG. 16 shows the structure (Comparative Example 3) in which an Al-codoped EDF 950 with the specifications in Table 1 and a P-Al-codoped EDF 960 with the specifications in Table 2 are respectively arranged on the upstream and downstream sides in place of the combination of the Al-codoped EDF 140, the P-Al-codoped EDF 150, and the Al-codoped EDF 160 in the EDFA shown in FIG. 12. With this structure, the total length of the amplification optical fibers was set to be almost equal to that in Embodiment 2 (FIG. 12), and the flatness of the gain spectrum was optimized, thereby forming an optical fiber amplifier. As a result, the Al-codoped EDF 950 had a length of 20 m, and the P-Al-codoped EDF 960 had a length of 8 m.

FIG. 17 shows the structure (Comparative Example 4) in which a P-Al-codoped EDF 970 with the specifications in Table 2 and an Al-codoped EDF 980 with the specifications in Table 1 are respectively arranged upstream and downstream in place of the combination of the Al-codoped EDF 140, the P-Al-codoped EDF 150, and the Al-codoped EDF 160 in the EDFA shown in FIG. 12. With this structure, the total length of the amplification optical fibers was set to be almost equal to that in Embodiment 4 (FIG. 13), and the flatness of the gain spectrum was optimized, thereby forming an optical fiber amplifier. As a result, the P-Al-codoped EDF 970 had a length of 5 m, and the Al-codoped EDF 980 had a length of 22 m.

Figure 18:
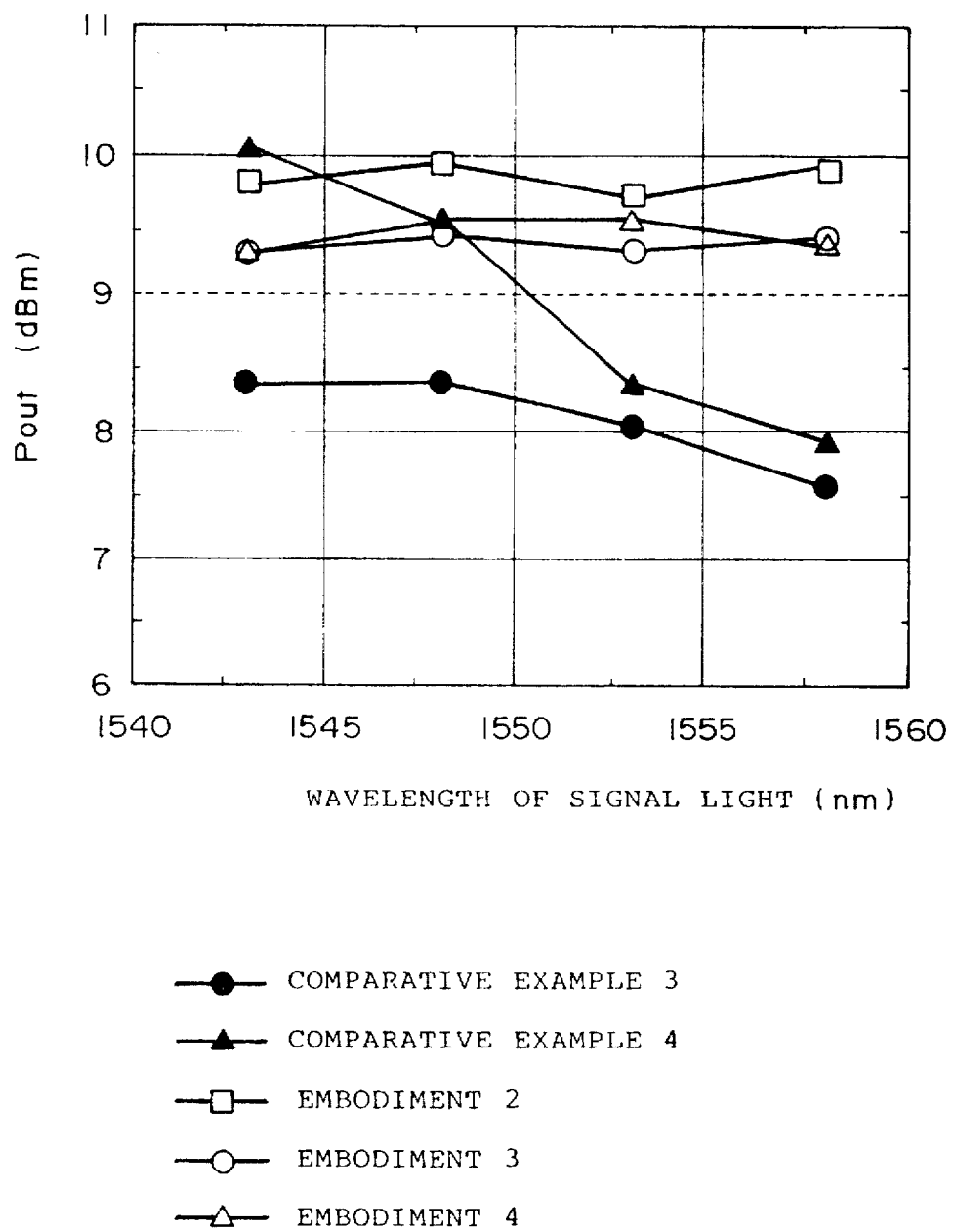
FIG. 18 is a graph showing the relationship between the wavelength of signal light and the output power as the optical transmission characteristics of each of the optical fiber amplifiers (Embodiments 2 to 4 and Comparative Examples 3 and 4) respectively shown in FIGS. 11 to 13 and 16 to 17.
Figure 19:
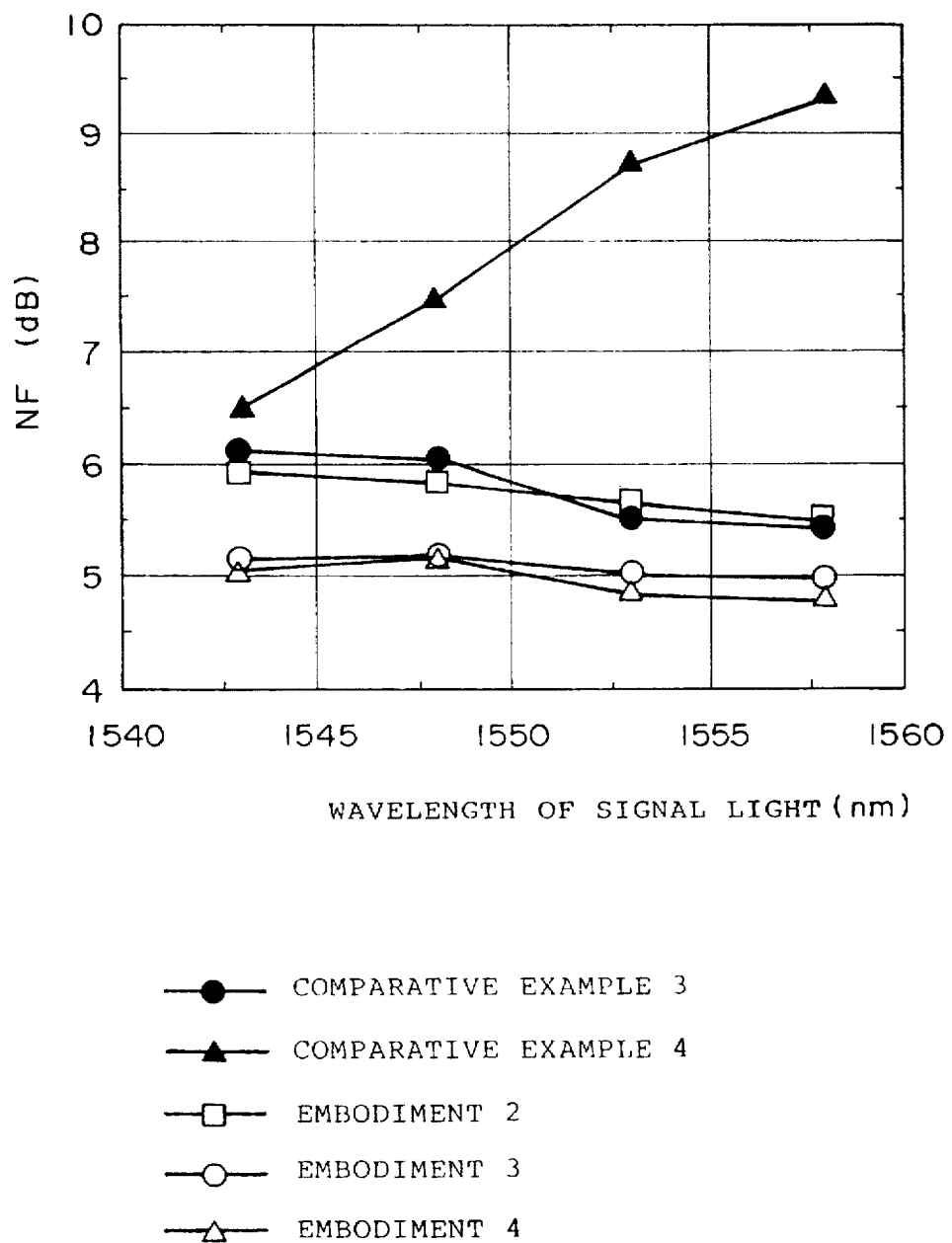
FIG. 19 is a graph showing the relationship between the wavelength of signal light and the noise figure (NF) as the optical transmission characteristics of each of the optical fiber amplifiers (Embodiments 2 to 4 and Comparative Examples 3 and 4) respectively shown in FIGS. 11 to 13 and 16 to 17.

FIGS. 18 and 19 are graphs showing the optical transmission characteristics of the optical fiber amplifiers of Embodiments 2, 3, and 4 (FIGS. 11 to 13), Comparative Example 3 (FIG. 16), and Comparative Example 4 (FIG. 17). FIG. 18 shows the relationship between the wavelength of signal light and the output optical power. FIG. 19 shows the relationship between the wavelength of signal light and the noise figure (NF). As is apparent from FIG. 18, the optical fiber amplifiers of Embodiments 2, 3, and 4 are superior to the remaining amplifiers in attaining a large output and a sufficiently flattened gain spectrum. As is apparent from FIG. 19, the optical fiber amplifiers of Embodiments 2, 3, and 4 and Comparative Example 3 are superior to the remaining amplifiers in attaining a reduction in noise. It is therefore apparent from FIGS. 18 and 19 that the optical fiber amplifiers of Embodiments 2, 3, and 4 are superior to Comparative Examples 3 and 4, which are conventional optical fiber amplifiers, in attaining a large output, low noise, and a sufficiently flattened gain spectrum, i.e., in overall optical transmission characteristics.

When Embodiment 2 (FIG. 11) is compared with Embodiment 1 (FIG. 1) with reference to FIGS. 9, 10, 18, and 19, it is confirmed that the NF is improved owing to the addition of the optical isolator 330 and the pumping direction of pumping light to the Al-codoped EDF 140 on the upstream side.

When Embodiment 2 (FIG. 11) is compared with Embodiment 3 (FIG. 12) with reference to FIGS. 18 and 19, it is confirmed that the NF is reduced to about 1 dB by changing the wavelength of pumping light incident on the amplification optical fiber 140 (145) on the upstream side from 1.48 μm to 0.98 μm.

When Embodiment 3 (FIG. 12) is compared with Embodiment 4 (FIG. 13) with reference to FIGS. 18 and 19, it is confirmed that the NF is further reduced by the insertion of the optical filter 520.

When the different feature (the presence of the optical filter 520) between Embodiment 3 (FIG. 12) and Embodiment 4 (FIG. 13) is applied to Embodiment 2 (FIG. 11), a reduction in NF similar to that in Embodiment 4 can be attained as compared with Embodiment 3 (FIG. 12).

Figure 15:
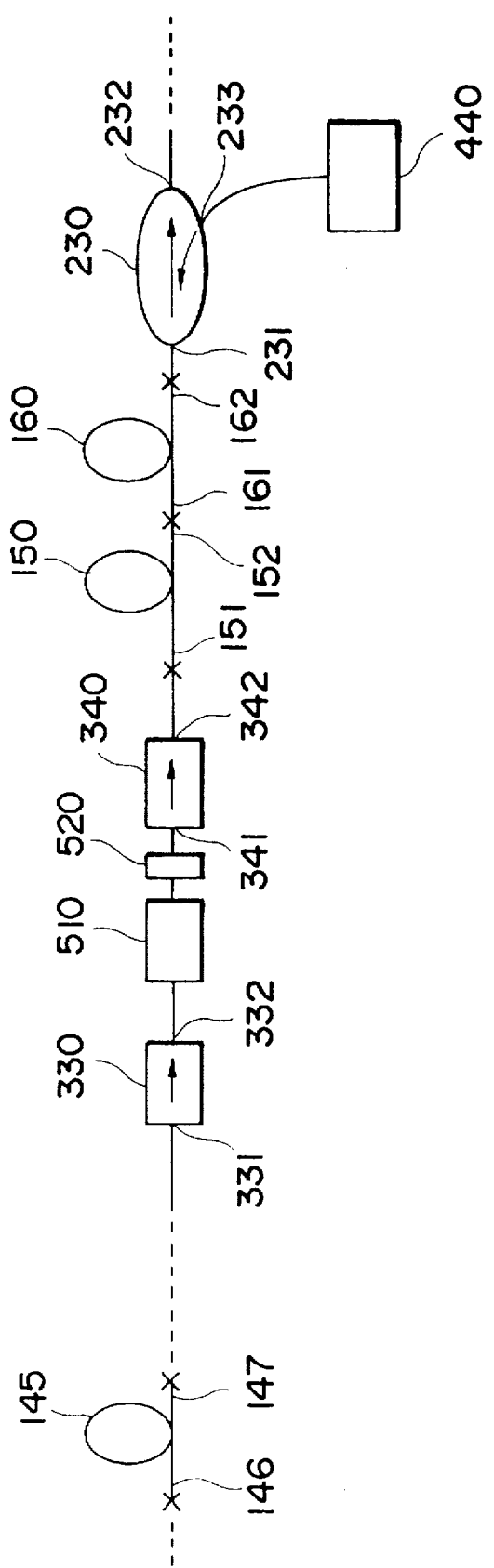
FIG. 15 is a block diagram showing the structure of the main part of an application of the optical fiber amplifier (Embodiment 4) in FIG. 13.

In addition, the same optical transmission characteristics as those shown in FIGS. 18 and 19 can also be obtained by inserting the optical isolator 330 immediately backward (downstream) the optical part 510 in Embodiments 2 and 3 (FIGS. 11 and 12) or inserting the optical isolator 340, which causes light to pass therethrough from the upstream side to the downstream side (in the propagating direction of signal light), immediately backward (downstream) the optical filter 520 in Embodiment 4 (FIG. 13) (see FIG. 15).

The above structure in which the optical part 510 or the P-Al-codoped EDF 150 and the optical filter 520 are placed between the optical isolators 330 and 340 is suitable for preventing spontaneous emission light generated and amplified by the P-Al-codoped EDF (second amplification optical fiber) placed between the first amplification optical fiber 140 (145) and the third amplification optical fiber 160 or by the downstream Al-codoped EDF (third amplification optical fiber) from being incident on the second amplification optical fiber or the third amplification optical fiber placed downstream, when the optical part 510 or the optical filter 520 is reflective.

When a plurality of optical fiber amplifiers, each identical to Embodiment 4, are connected to each other, the amount of pumping light power consumed to amplify spontaneous emission light having a wavelength of about 1.53 μm is smaller than that when a plurality of optical fiber amplifiers, each having no optical filter 520, are connected to each other. Therefore, signal light can be efficiently amplified, and the final output power can be increased.

Embodiment 5

Figure 20:
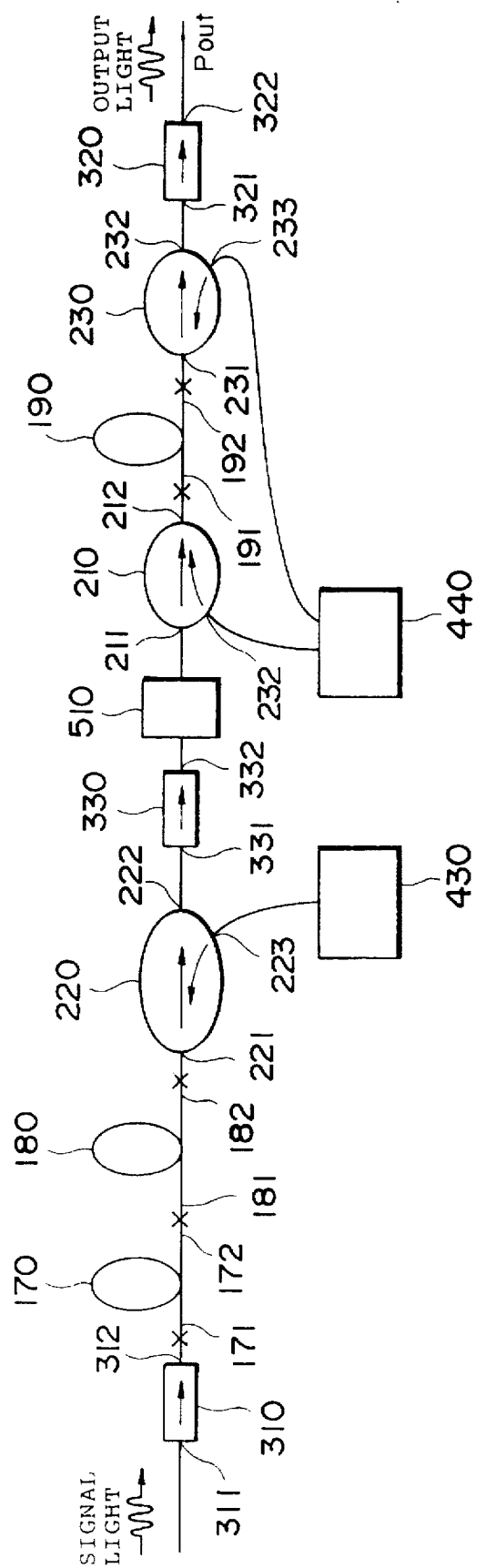
FIG. 20 is a block diagram showing the structure of an optical fiber amplifier according to a fifth embodiment (Embodiment 5) of the present invention.

FIG. 20 shows the structure of an optical fiber amplifier according to a fifth embodiment (Embodiment 5) of the present invention. As shown in FIG. 20, this hybrid EDFA includes (a) an optical isolator 310 which receives signal light through a terminal 311 and outputs it to a terminal 312, but does not output light incident on the terminal 312 from the terminal 311, (b) an Al-codoped EDF 170 which receives through a terminal 171 the light (including the signal light) output from the terminal 312 of the optical isolator 310, amplifies the signal light, and outputs it from a terminal 172, (c) a P-Al-codoped EDF 180 which receives through a terminal 181 the light (including the signal light) output from the terminal 172 of the Al-codoped EDF 170, amplifies the signal light, and outputs it from a terminal 182, (d) a WDM coupler 220 which receives through a terminal 221 the light (including the signal light) output from the terminal 182 of the P-Al-codoped EDF 180 and outputs it from a terminal 222, and also receives pumping light having a wavelength of 1.48 μm through a terminal 223 and outputs it from the terminal 221, (e) an optical isolator 330 which receives through a terminal 331 the light (including the signal light) output from the terminal 222 of the WDM coupler 220 and outputs it from a terminal 332, but does not output light incident on the terminal 332 from the terminal 331, (f) an optical part 510 with a transmission loss which receives the light (including the signal light) output from the terminal 332 of the optical isolator 330 and outputs it, (g) a WDM coupler 210 which receives through a terminal 211 the light (including the signal light) output from the optical part 510 and outputs it from the terminal 212, and also receives pumping light having a wavelength of 1.48 μm through a terminal 213 and outputs it from a terminal 212, (h) an Al-codoped EDF 190 which receives through a terminal 191 the light (including the signal light) output from the terminal 212 of the WDM coupler 210, amplifies the signal light, and outputs it from a terminal 192, (i) a WDM coupler 230 which receives through a terminal 231 the light (including the signal light) output from the terminal 192 of the Al-codoped EDF 190 and outputs it from a terminal 232, and also receives pumping light having a wavelength of 1.48 μm through a terminal 233 and outputs it from the terminal 232, (j) an optical isolator 320 which receives through a terminal 321 the light (including the signal light) output from the terminal 232 of the WDM coupler 230 and outputs it from a terminal 322, but does not output light incident on the terminal 322 from the terminal 321, (k) a light source 430 which generates pumping light having a wavelength of 1.48 μm at an output of 50 mW, and outputs it to the terminal 223 of the WDM coupler 220, and (l) a light source 440 which generates pumping light having a wavelength of 1.48 μm at an output of 70 mW, and outputs it to the terminals 213 and 233 of the WDM couplers 210 and 230.

Similar to Embodiment 2 (FIG. 11), a dispersion compensating optical fiber or an optical demultiplexing coupler is available as the optical part 510. Assume that in Embodiment 5, the optical part 510 has a propagation loss of 8 dB.

Similar to Embodiment 1 (FIG. 1), the specifications of the optical fiber amplifier in FIG. 20 include that the amplifier amplifies four wavelength-multiplexed signals (respectively having channel wavelengths of 1.543 μm, 1.548 μm, 1.553 μm, and 1.558 μm) having an optical power of −18 dBm/channel to at least +9 dBm/channel or more. Table 1 shows the specifications of the Al-codoped EDFs 170 and 190. Table 2 shows the specifications of the P-Al-codoped EDF 180.

When the optical fiber amplifier in FIG. 20 is fabricated with the flatness of the gain spectrum being optimized under the above conditions, the Al-codoped EDF 140 has a length of 12 m; the P-Al-codoped EDF 150, 2 m; and the Al-codoped EDF 160, 12 m.

Figure 21:
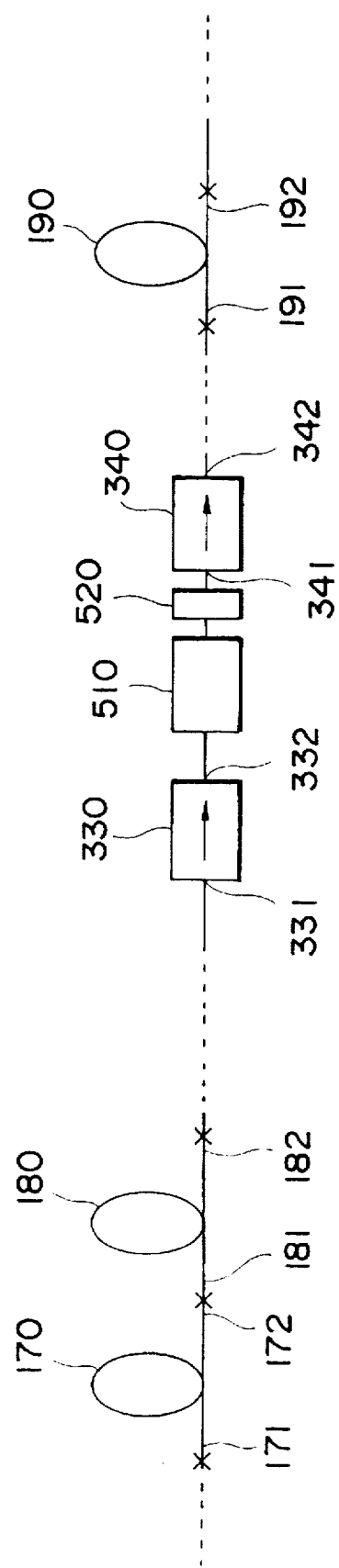
FIG. 21 is a block diagram showing the structure of the main part of an application of the optical fiber amplifier (Embodiment 5) shown in FIG. 20.

In Embodiment 5 as well, in order to prevent noise light from mixing with signal light, it is preferable that a plurality of optical isolators 330 and 340 be arranged between the P-Al-codoped EDF 180 and the Al-codoped EDF 190, and the optical part 510 and the like be arranged between the optical isolators 330 and 340, as shown in FIG. 21. Note that the optical isolator 340 has first and second terminals 341 and 342 like the optical isolator 330 described above.

Figure 22:
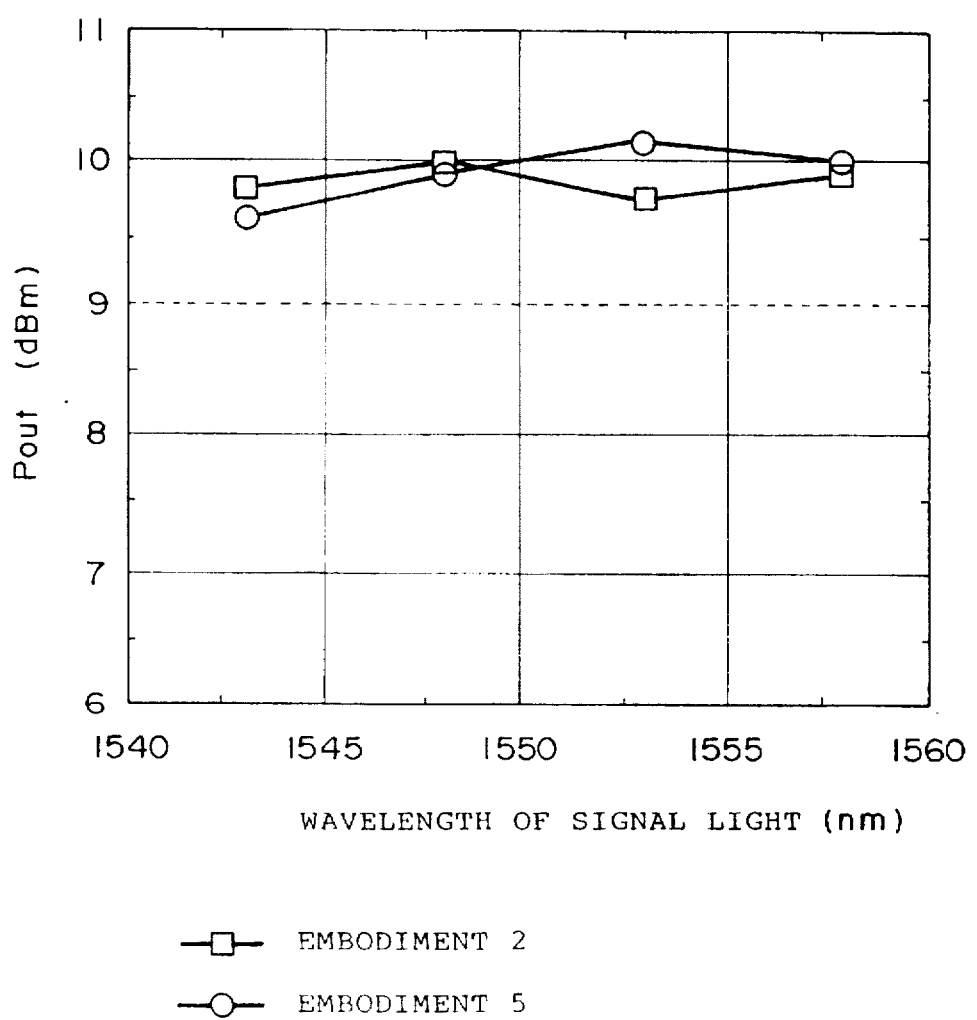
FIG. 22 is a graph showing the relationship between the wavelength of signal light and the output power as the optical characteristics of each of the optical fiber amplifiers (Embodiments 2 and 5) respectively shown in FIGS. 11 and 20.
Figure 23:
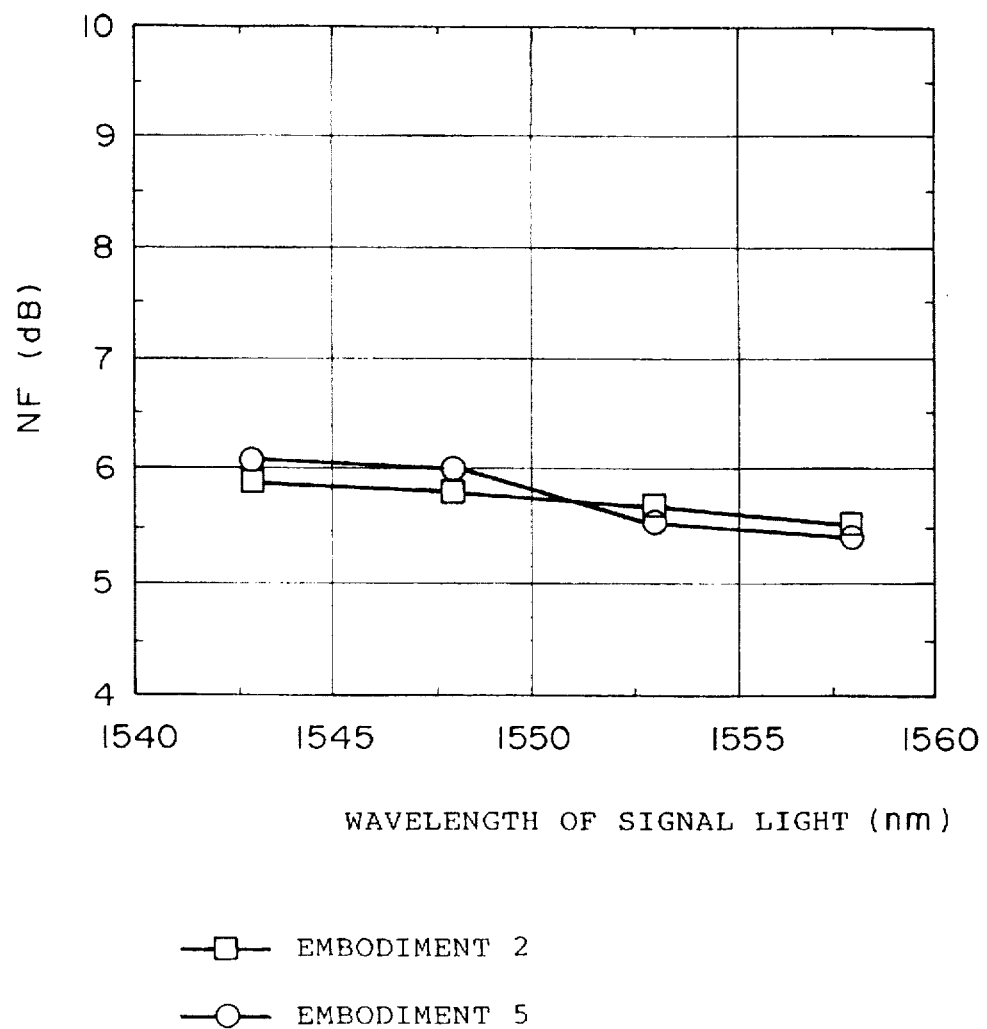
FIG. 23 is a graph showing the relationship between the wavelength of signal light and the noise figure (NF) as the optical characteristics of each of the optical fiber amplifiers (Embodiments 2 and 5) respectively shown in FIGS. 11 and 20.

FIGS. 22 and 23 are graphs showing the optical transmission characteristics of the optical fiber amplifiers of Embodiment 5 (FIG. 20) and Embodiment 2 (FIG. 11). FIG. 22 shows the relationship between the wavelength of signal light and the output optical power. FIG. 23 shows the relationship between the wavelength of signal light and the noise figure (NF). As is apparent from FIGS. 22 and 23, Embodiment 5 (FIG. 20) has optical transmission characteristics similar to those of Embodiment 2 (FIG. 11).

When an optical demultiplexing coupler is used as the optical part 510, the signal output of the optical demultiplexing coupler in Embodiment 5 (FIG. 20) can be set to be larger than that in Embodiment 2 (FIG. 11), provided that the number of times of demultiplexing remains the same. In Embodiment 5, therefore, an optical receiver can be installed at a remoter place from an intermediate demultiplexing position.

If the different feature (the presence of the optical filter 520) between Embodiment 3 (FIG. 12) and Embodiment 4 (FIG. 13) is applied to Embodiment 5 (FIG. 20), a reduction in NF similar to that in Embodiment 4 can be attained as compared with Embodiment 3 (FIG. 12) (see FIG. 21).

In addition, similar to Embodiment 2 (FIG. 11), the same optical transmission characteristics as those shown in FIGS. 22 and 23 can also be obtained by inserting the optical isolator 340, which causes light to pass therethrough from the upstream side to the downstream side (in the propagating direction of signal light), immediately backward (downstream) the optical part 510 (see FIG. 21).

Similar to Embodiment 2, the above structure in which the optical part 510 or the P-Al-codoped EDF 150 and the optical filter 520 are placed between the optical isolators 330 and 340 is suitable for preventing spontaneous emission light generated and amplified by the downstream Al-codoped EDF from being incident on the Al-codoped EDF on the upstream side again, when the optical part 510 or the optical filter 520 is reflective.

The present invention is not limited to the examples described above and can be modified. For example, specifications other than those in the above examples can be used for Al-codoped EDFs and P-Al-codoped EDFs. In this case, the length of each amplification optical fiber must be optimized.

As has been described in detail above, according to the optical fiber amplifier of the present invention, three amplification optical fibers are used such that the first value as the (emission cross-section)/(absorption cross-section) of the first amplification optical fiber on the upstream side and the third value as the (emission cross-section)/(absorption cross-section) of the third amplification optical fiber on the downstream side are set to be larger than the second value as the (emission cross-section)/(absorption cross-section ratio) of the second amplification optical fiber placed between the first and third amplification optical fibers. With this arrangement, low noise can be achieved in the first amplification optical fiber, and a large output can be obtained in the third amplification optical fiber. In addition, the gain spectrum associated with wavelength in this optical fiber amplifier including the first, second, and third amplification optical fibers can be sufficiently made flat.

The optical fiber amplifier of the present invention may include one or more optical isolators between the first and second amplification optical fibers. The optical isolator prevents spontaneous emission light generated and amplified by the second or third amplification optical fiber from being incident on the first amplification optical fiber, thereby attaining a further reduction in noise.

In addition, the optical fiber amplifier of the present invention may include one or more optical isolators between the second and third amplification optical fibers. The optical isolator prevents spontaneous emission light generated and amplified by the third amplification optical fiber from being incident on the first or second amplification optical fiber, thereby attaining a further reduction in noise.

From the invention thus described, it will be obvious that the invention may be varied in many ways. Such variations are not to be regarded as a departure from the spirit and scope of the invention, and all such modifications as would be obvious to one skilled in the art are intended to be included within the scope of the following claims.

The basic Japanese Application No. 301469/1995 filed on Nov. 20, 1995 is hereby incorporated by reference.

What is claimed is:

1. An optical fiber amplifier comprising:

a first amplification section for amplifying signal light having a wavelength within a predetermined wavelength range and outputting the amplified signal light, said first amplification section including a first optical fiber which has a first gain in the predetermined wavelength range and is pumped by first pumping light having a first wavelength to amplify the input signal light, and said first optical fiber having a first value as a ratio of its emission cross-section to its absorption cross-section;

a second amplification section for amplifying the signal light output from said first amplification section and outputting the amplified signal light, said second amplification section including a second optical fiber which has a second gain in the predetermined wavelength range and is pumped by second pumping light having a second wavelength to amplify the signal light from said first amplification section, and said second optical fiber having a second value as a ratio of its emission cross-section to its absorption cross-section which is smaller than the first value; and a third amplification section for amplifying the signal light output from said second amplification section and outputting the amplified signal light, said third amplification section including a third optical fiber which has a third gain in the predetermined wavelength range and is pumped by third pumping light having a third wavelength to amplify the input signal light from said second amplification section, and said third optical fiber having a third value as a ratio of its emission cross-section to its absorption cross-section which is larger than the second value, wherein, with respect to changes in wavelength in the predetermined wavelength range, an overall gain spectrum of said optical fiber amplifier is flatter than each of the first gain spectrum, the second gain spectrum, and the third gain spectrum.

2. An amplifier according to claim 1, wherein the first gain spectrum in the predetermined wavelength range has a positive or negative slope with respect to changes in wavelength in the predetermined wavelength range, the third gain spectrum in the predetermined wavelength range has a slope having the same sign as that of the first gain spectrum, and the second gain spectrum in the predetermined wavelength range has a sign opposite to the sign of the first gain spectrum.

3. An amplifier according to claim 1, wherein said first and third optical fibers have the same composition.

4. An amplifier according to claim 1, wherein said first and third optical fibers are erbium-doped fibers codoped with aluminum, and said second optical fiber is an erbium-doped fiber codoped with phosphorus.

5. An amplifier according to claim 4, wherein said second optical fiber is further codoped with aluminum.

6. An amplifier according to claim 1, further comprising at least one optical isolator placed between said first and second optical fibers to constitute a part of a transmission line of the signal light.

7. An amplifier according to claim 6, further comprising a first directional optical coupler placed between said first and second optical fibers to constitute a part of the transmission line of the signal light, said first directional optical coupler including:

a first terminal optically connected to one end of said first optical fiber, the first terminal receiving the signal light from said first optical fiber and outputting the first pumping light to said first optical fiber;

a second terminal optically connected to one end of said second optical fiber, the second terminal outputting the input signal light to said second optical fiber; and a third terminal for receiving the first pumping light.

8. An amplifier according to claim 6, wherein the first wavelength is about 0.98 µm, and each of the second and third wavelengths is about 1.48 µm.

9. An amplifier according to claim 1, further comprising at least one optical isolator placed between said second and third optical fibers to constitute a part of a transmission line of the signal light.

10. An amplifier according to claim 9, further comprising a second directional optical coupler placed between said second and third optical fibers to constitute a part of the transmission line of the signal light, said second directional optical coupler including:
   a first terminal optically coupled to one end of said second optical fiber, the first terminal receiving the signal light from said second optical fiber and outputting the second pumping light to said first optical fiber;
   a second terminal optically coupled to one end of said third optical fiber, the second terminal outputting the input signal light to said third optical fiber; and
   a third terminal for receiving the second pumping light, and
   wherein the second pumping light includes the first pumping light.

11. An amplifier according to claim 6, further comprising a dispersion compensating optical fiber placed between said optical isolator and said second optical fiber to constitute a part of the transmission line of the signal light.

12. An amplifier according to claim 1, further comprising:
   a plurality of optical isolators arranged between said first and second optical fibers to constitute a part of a transmission line of the signal light; and
   a dispersion compensating optical fiber placed between adjacent optical isolators included in said plurality of optical isolators to constitute a part of the transmission line of the signal light.

13. An amplifier according to claim 6, further comprising a wavelength selection filter placed at a predetermined position between said optical isolator and said second optical fiber to constitute a part of the transmission line of the signal light.

14. An amplifier according to claim 1, further comprising:
   a plurality of optical isolators arranged between said first and second optical fibers to constitute a part of a transmission line of the signal light; and
   a wavelength selection filter placed between adjacent optical isolators included in said plurality of optical isolators to constitute a part of the transmission line of the signal light.

15. An amplifier according to claim 6, further comprising a demultiplexing optical coupler placed at a predetermined position between said optical isolator and said second optical fiber to constitute a part of the transmission line of the signal light.

16. An amplifier according to claim 6, further comprising:
   a plurality of optical isolators arranged between said first and second optical fibers to constitute a part of a transmission line of the signal light; and
   a demultiplexing optical coupler placed between adjacent optical isolators included in said plurality of optical isolators to constitute a part of the transmission line of the signal light.

17. An amplifier according to claim 9, further comprising a dispersion compensating optical fiber placed between said optical isolator and said third optical fiber to constitute a part of the transmission line of the signal light.

18. An amplifier according to claim 1, further comprising:
   a plurality of optical isolators arranged between said second and third optical fibers to constitute a part of a transmission line of the signal light; and
   a dispersion compensating optical fiber placed between adjacent optical isolators included in said plurality of optical isolators to constitute a part of the transmission line of the signal light.

19. An amplifier according to claim 9, further comprising a wavelength selection filter placed between said optical isolator and said third optical fiber to constitute a part of the transmission line of the signal light.

20. An amplifier according to claim 1, further comprising:
   a plurality of optical isolators arranged between said second and third optical fibers to constitute a part of a transmission line of the signal light; and
   a wavelength selection filter placed between adjacent optical isolators included in said plurality of optical isolators to constitute a part of the transmission line of the signal light.

21. An amplifier according to claim 9, further comprising a demultiplexing optical coupler placed between said optical isolator and said third optical fiber to constitute a part of the transmission line of the signal light.

22. An amplifier according to claim 1, further comprising:
   a plurality of optical isolators arranged between said second and third optical fibers to constitute a part of a transmission line of the signal light; and
   a demultiplexing optical coupler placed between adjacent optical isolators included in said plurality of optical isolators to constitute a part of the transmission line of the signal light.

* * * * *